United States Patent
Kato et al.

(10) Patent No.: US 7,578,620 B2
(45) Date of Patent: *Aug. 25, 2009

(54) LINEAR GUIDE DEVICE

(75) Inventors: Soichiro Kato, Maebashi (JP);
Nobuhide Kurachi, Fujisawa (JP);
Masaru Akiyama, Fujisawa (JP); Jun Matsumoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 469 days.

This patent is subject to a terminal disclaimer.

(21) Appl. No.: 10/557,606

(22) PCT Filed: Oct. 21, 2004

(86) PCT No.: PCT/JP2004/015583

§ 371 (c)(1),
(2), (4) Date: Nov. 22, 2005

(87) PCT Pub. No.: WO2005/038276

PCT Pub. Date: Apr. 28, 2005

(65) Prior Publication Data

US 2007/0071371 A1     Mar. 29, 2007

(30) Foreign Application Priority Data

| Oct. 21, 2003 | (JP) | ............................. 2003-360124 |
| Oct. 21, 2003 | (JP) | ............................. 2003-360129 |
| Nov. 26, 2003 | (JP) | ............................. 2003-395584 |
| Dec. 22, 2003 | (JP) | ............................. 2003-425792 |

(51) Int. Cl.
*F16C 29/06* (2006.01)
(52) U.S. Cl. .......................................... 384/44; 384/51
(58) Field of Classification Search ................... 384/44, 384/51
See application file for complete search history.

(56) References Cited

U.S. PATENT DOCUMENTS 6,102,572 A     8/2000    Hidano (Continued)

FOREIGN PATENT DOCUMENTS

JP      40-24405 B1     10/1965

(Continued)

OTHER PUBLICATIONS

International Search Report dated Feb. 8, 2005.
International Preliminary Report on Patentability dated Jul. 27, 2006 (10 pages).
International Search Report Dated Feb. 8, 2005 (Four (4) Pages).

*Primary Examiner*—Thomas R Hannon
(74) *Attorney, Agent, or Firm*—Crowell & Moring LLP

(57) ABSTRACT

A linear guide device has a retaining piece (15) between two adjacent rollers (9). The retaining piece (15) has a retaining piece body (16) having left side-face section and a right side-face section that are parallel to the end face sections of the rollers (9), a first arm section (19) extending from the left side-face section of the retaining piece body (16) toward the end face sections of the two adjacent rollers (9) and fitting in a first guide groove (22) formed in one wall surface section of a circulation path (21), and a second arm section (20) provided on the right side-face section of the retaining piece body (16) so as to be parallel to the first arm section (19) and fitting in a second guide groove (23) formed in the other wall surface section of the circulation path (21). The heights of the retaining piece body (16) and the arm sections (19, 20) satisfy the conditional expression of $(H1-H2)/2 < (Dw-W)/2$, where $H1$ is the height of the retaining piece body (16), in the direction perpendicular to the axial direction of a roller; $H2$ the height of the arm sections (19, 20) in the direction perpendicular to the axial direction of the roller; $W$ the width of the guide grooves (22, 23) in the direction perpendicular to the axial direction of the roller; and $Dw$ the diameter of the roller (9).

11 Claims, 22 Drawing Sheets

U.S. PATENT DOCUMENTS 7,467,895 B2 * 12/2008 Kurachi et al. ............. 384/51
2002/0178852 A1   12/2002 Yamaguchi

FOREIGN PATENT DOCUMENTS

| JP | 48-104943 | 10/1973 |
| JP | 10-281154 A | 10/1998 |
| JP | 11-247855 A | 9/1999 |
| JP | 2001-132745 A | 5/2001 |
| JP | 2002-339967 A | 11/2002 |
| JP | 2003-269463 A | 9/2003 |
| JP | 2004-245233 A | 9/2004 |

* cited by examiner

LINEAR GUIDE DEVICE

TECHNICAL FIELD

The present invention concerns a linear guide device for guiding an object that conducts linear motion in the moving direction thereof and, particularly, it relates to a linear guide device using rollers as rolling elements.

BACKGROUND ART

A linear guide device using rollers as rolling elements generally includes a rail having a lateral left face and a lateral right face surface, a slider having a front end face and a rear end face in the longitudinal direction of the rail and end caps each attached on the front end face and the rear end face of the slider, in which slider-side raceway surfaces opposed to rail-side raceway surfaces formed on the lateral left face and the lateral right face of the rail are formed on two opposing inner lateral faces of the slider. Further, the linear guide device of this type has a plurality of rollers. The rollers are adapted to roll through rolling element rolling channels formed between the rail-side raceway surfaces and the slider-side raceway surfaces by the relative movement of the slider in the longitudinal direction of the rail. Then, the rollers rolling through the rolling element rolling channels change direction in direction changing channels for rolling elements formed in the end cap, then return to the original position through rolling element returning channels formed in the slider along the longitudinal direction of the rail, and again circulate the path described above.

In the linear guide device described above, in a case where a succeeding roller collides against the preceding roller, it may possibly generate sounds or deteriorate the operating performance of the slider. In view of the above, in the linear guide device disclosed in JP2001-132745A, a retaining piece made of resin is interposed between each of the rollers thereby preventing occurrence of noises or deterioration of the operating performance caused by collision between each of the rollers.

However, in a case where the distance between the two adjacent rollers increases during movement of the slider, the retaining piece is in contact with the rail-side raceway surface or the slider-side raceway surface and the retaining piece suffers from early wear to result in a problem of shortening the life of the retaining piece. In addition, the retaining piece is deformed by the contact of the retaining piece with the rail-side raceway surface, the slider-side raceway surface, etc. to possibly deteriorate the operating performance of the slider.

DISCLOSURE OF THE INVENTION

A first object of the present invention is to provide a linear guide device capable of suppressing the skew of a roller to improve the operating performance. Further, a second object of the invention is to provide a linear guide device capable of suppressing increase of a sound level caused by collision between rollers to each other thereby reducing the noise. Further, a third object of the invention is to provide a linear guide device capable of suppressing early wear of a retaining piece and capable of ensuring smooth actuation of a slider. Furthermore, a fourth object of the invention is to provide a linear guide device capable of improving the assembling efficiency.

For attaining such objects, the invention provides a linear guide device including a rail having a lateral left face and a lateral right face, a slider having a front end face and a rear end face in the longitudinal direction of the rail and having slider-side raceway surfaces opposing to rail-side raceway surfaces formed on the lateral left face and the lateral right face of the rail, end caps each attached to the front end face and the rear end face of the slider, a plurality of rollers that roll along with the relative linear motion of the slider through circulation channels formed of rolling element rolling channels formed between the rail-side raceway surfaces and the slider-side raceway surfaces, rolling element returning channels formed in the slider along the longitudinal direction of the rail and direction changing channels for rolling elements formed in the end caps, and a plurality of retaining pieces each disposed between the rollers, in which the retaining pieces have a retaining piece body having a lateral left face and a lateral right face, a first arm portion extending from the lateral left face of the retaining piece body toward end faces of the two adjacent rollers and fitting a first guide groove formed to one of wall surface portions of the circulation channels, and a second arm portion disposed in parallel with the first arm portion on the lateral right face of the retaining piece body and fitting a second guide groove formed to the other of the wall surface portion of the circulation channels, wherein the height for the retaining piece body and the height of the arm portion are defined to such a height that satisfies the conditional relation: $(H1-H2)/2 < (Dw-W)/2$ where $H1$ represents the height of the retaining piece body in the direction crossing the axial direction of the roller, $H2$ represents the height of the first and the second arm portions in the direction crossing the axial direction of the roller, $W$ represents the width of the first and the second guide grooves in the direction crossing the axial direction of the roller, and $Dw$ represents the diameter of the roller.

The invention provides a linear guide device including a rail having a lateral left face and a lateral right face, a slider having a front end face and a rear end face in the longitudinal direction of the rail and having slider-side raceway surfaces opposing to rail-side raceway surfaces formed on the lateral left face and the lateral right face of the rail, end caps each attached to the front end face and the rear end face of the slider, a plurality of rollers that roll along with the relative linear motion of the slider through circulation channels formed of rolling element rolling channels formed between the rail-side raceway surfaces and the slider-side raceway surfaces, rolling element returning channels formed in the slider along the longitudinal direction of the rail and direction changing channels for rolling elements formed in the end caps, and a plurality of retaining pieces each disposed between the rollers, in which the retaining pieces have a retaining piece body having a lateral left face and a lateral right face, a first arm portion extending from the lateral left face of the retaining piece body toward end faces of the two adjacent rollers and fitting a first guide groove formed to one of wall surface portions of the circulation channels, and a second arm portion disposed in parallel with the first arm portion on the lateral right face of the retaining piece body and fitting a second guide groove formed to the other of the wall surface portion of the circulation channels, wherein the height of the first and the second arm portions in the direction crossing the axial direction of the roller is defined as a height that satisfies the conditional relation: $0.20 \leq H2/Dw \leq 0.5$ where $H2$ represents the height of the arm portions and $Dw$ represents the diameter of the roller.

The invention provides a linear guide device including a rail having a lateral left face and a lateral right face, a slider having a front end face and a rear end face in the longitudinal direction of the rail and having slider-side raceway surfaces opposing to rail-side raceway surfaces formed on the lateral left face and the lateral right face of the rail, end caps each attached to the front end face and the rear end face of the slider, a plurality of rollers that roll along with the relative linear motion of the slider through circulation channels formed of rolling element rolling channels formed between the rail-side raceway surfaces and the slider-side raceway surfaces, rolling element returning channels formed in the slider along the longitudinal direction of the rail and direction changing channels for rolling elements formed in the end caps, and a plurality of retaining pieces each disposed between the rollers, in which the retaining pieces have a retaining piece body having a lateral left face and a lateral right face, a first arm portion extending from the lateral left face of the retaining piece body toward end faces of the two adjacent rollers and fitting a first guide groove formed to one of wall surface portions of the circulation channels, and a second arm portion disposed in parallel with the first arm portion on the lateral right face of the retaining piece body and fitting a second guide groove formed to the other of the wall surface portion of the circulation channels, wherein the length of the first and the second arm portions is defined to such a length that both ends of the first and the second arm portions are situated to the outside of a circle having the center at a central portion of the retainer piece body and having a diameter 113, where 113 represents the distance between an outer lateral face of the first arm portion and an outer lateral face of the second arm portion.

The invention provides a linear guide device, wherein the length of the first and the second arm portions is defined to such a length that the both ends of the first and the second arm portions are situated to the outside of a circle having the center at a central portion of the rolling element rolling channel and having a diameter H4, where H4 represents the distance between a bottom of the first guide groove and a bottom of the second guide groove.

The invention provides a linear guide device, wherein a distance H5 between an end portion of the outer lateral face of the first arm portion and an end portion of the outer lateral face of the second arm portion, and a distance H6 between a central portion of the outer lateral face of the first arm portion and a central portion of the outer lateral face of the second arm portion are in a relation: H5<H6.

The invention provides a linear guide device, wherein the end portion of the outer lateral face of the first and the second arms is formed as an arcuate face convex to the bottom of the first and the second guide grooves.

The invention provides a linear guide device, wherein the end portion of the outer lateral face of the first and the second arm is formed as a tapered face relative to the bottom of the first and the second guide grooves.

The invention provides a linear guide device, wherein a distance H7 between an end portion of an inner lateral face of the first arm portion and an end portion of an inner lateral face of the second arm portion, and a distance H8 between a central portion of the inner lateral face of the first arm portion and a central portion of the inner lateral face of the second arm portion are in a relation: H7<H8.

The invention provides a linear guide device, wherein the end portion of the outer lateral face of the first and the second arms is formed as an arcuate face convex to the end face of the roller.

The invention provides a linear guide device according to claim 8 wherein the end portion of the inner lateral face of the first and the second arms is formed as a tapered face relative to the end face of the roller.

The invention provides a linear guide device including a rail having a lateral left face and a lateral right face, a slider having a front end face and a rear end face in the longitudinal direction of the rail and having slider-side raceway surfaces opposing to rail-side raceway surfaces formed on the lateral left face and the lateral right face of the rail, end caps each attached to the front end face and the rear end face of the slider, a plurality of rollers that roll along with the relative linear motion of the slider through circulation channels formed of rolling element rolling channels formed between the rail-side raceway surfaces and the slider-side raceway surfaces, rolling element returning channels formed in the slider along the longitudinal direction of the rail and direction changing channels for rolling elements formed in the end caps, and a plurality of retaining pieces each disposed between the rollers, in which the retaining pieces have a retaining piece body having a lateral left face and a lateral right face, a first arm portion extending from the lateral left face of the retaining piece body toward end faces of the two adjacent rollers and fitting a first guide groove formed to one of wall surface portions of the circulation channels, and a second arm portion disposed in parallel with the first arm portion on the lateral right face of the retaining piece body and fitting a second guide groove formed to the other of the wall surface portion of the circulation channels, and has a minimum thickness at a portion put between the two adjacent rollers, wherein plural kinds of retaining pieces each of different minimum thickness are each interposed between each of the rollers, and each of the retaining pieces is applied with a identification mark for identifying the kind thereof.

The invention provides a linear guide device according, wherein the retaining pieces are classified by colors on every kinds of different minimum thickness.

BEST MODE FOR PRACTICING THE INVENTION

A first embodiment of the present invention is to be described with reference to FIG. 1 to FIG. 8.

Figure 1:
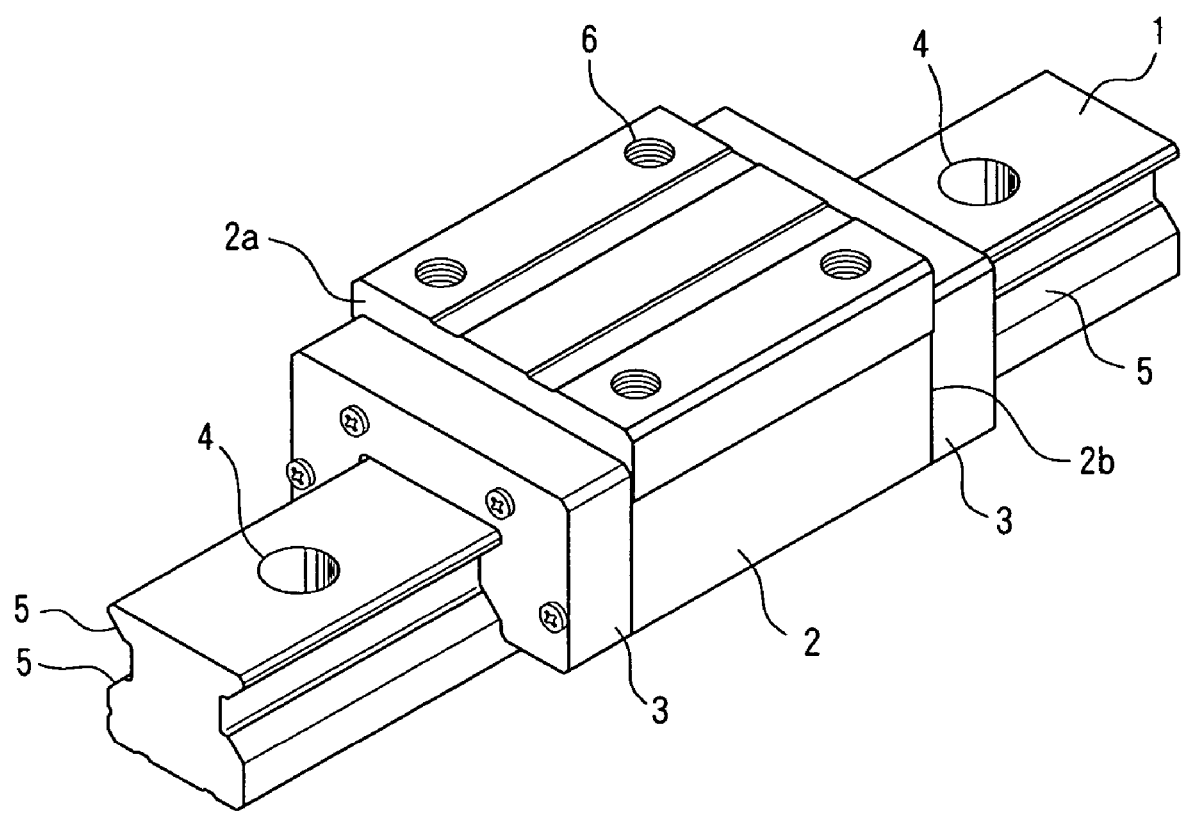
FIG. 1 is a perspective view of a linear guide device according to a first embodiment of the present invention.
Figure 2:
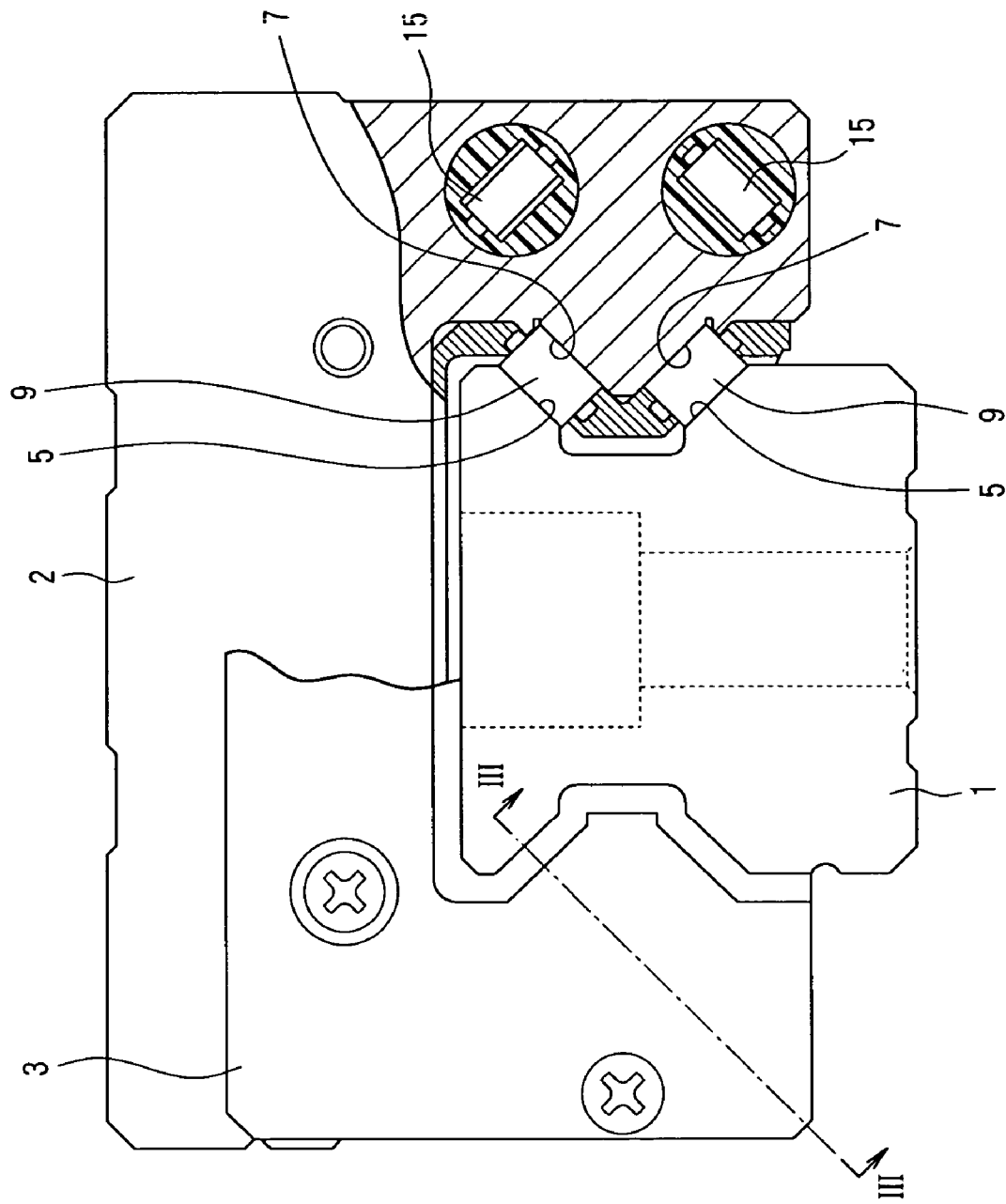
FIG. 2 is a front elevational view of the linear guide device shown in FIG. 1.
Figure 3:
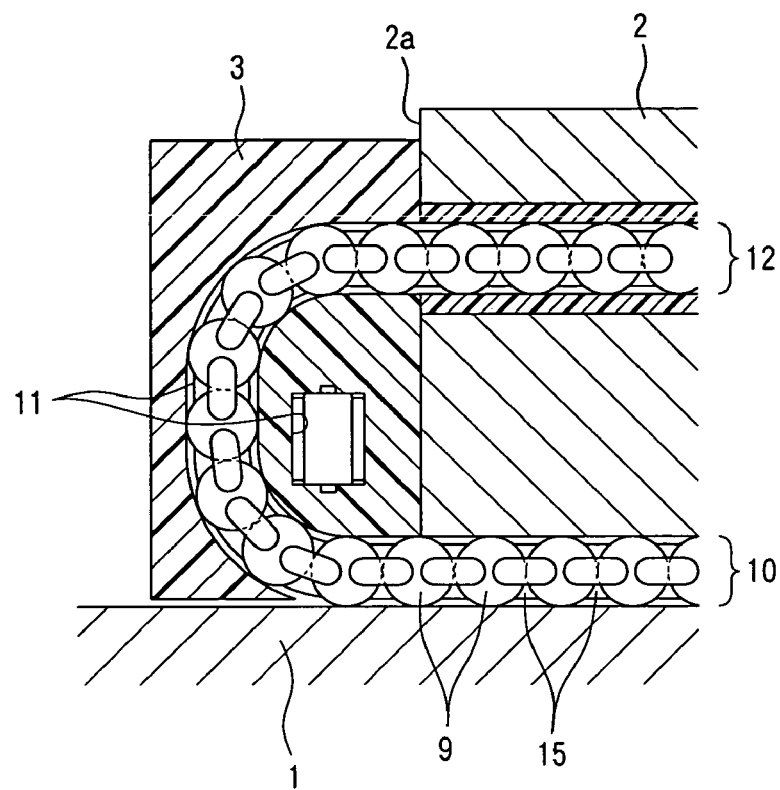
FIG. 3 is a III-III cross sectional view of FIG. 2.

In FIG. 1, a linear guide device according to the first embodiment of the invention has a rail 1, a slider 2 having a front end face 2a and a rear end face 2b in the longitudinal direction of the rail 1 and two end caps 3 each attached on both end faces 2a and 2b in the front-to-rear direction of the slider 2.

The rail 1 is formed of a steel material such as an alloy steel. Rail attaching holes 4 for securing the rail 1 on a base of a machine tool by means of not illustrated bolts are perforated in an upper surface of the rail 1 each at a predetermined pitch in the longitudinal direction of the rail 1. Further, the rail 1 is formed into a shape similar to an I-shaped configuration for a cross section along the lateral direction of the rail 1. The rail-side raceway surfaces 5 are formed each by two on a lateral left face and a lateral right face of the rail 1 along the longitudinal direction of the rail 1.

The slider 2 is formed of a steel material such as an alloy steel like the rail 1. Threaded holes 6 for securing the slider 2 to a moving bed of a machining tool by means of not illustrated bolts are formed at plural positions in an upper surface of the slider 2. The slider 2 is formed into a shape similar with a saddle for the cross section along the lateral direction of the rail 1. Slider-side raceway surfaces 7 (refer to FIG. 2) are formed each by two to two opposed inner lateral faces of the slider 2 along the longitudinal direction of the rail 1.

The rail-side track way surface 5 and the slider-side track way surface 7 are opposed to each other in which a plurality of rollers 9 are assembled between the rail-side raceway surface 5 and the slider-side raceway surface 7. The rollers 9 are adapted to roll along rolling element rolling channels 10 (refer to FIG. 3) formed between the rail-side raceway surfaces 5 and the slider-side raceway surfaces 7 and then enter direction changing channels 11 for rolling elements formed in the end cap 3 when the slider 2 moves relatively in the longitudinal direction of the rail 1. The direction changing channels 11 for rolling elements are bent into a U-shaped configuration. The rollers 9 that have changed the direction along the direction changing channels 11 for rolling elements return to original position passing through rolling element returning channels 12 (refer to FIG. 3) formed in the slider 2 and then again roll along the path described above repetitively.

Figure 4:
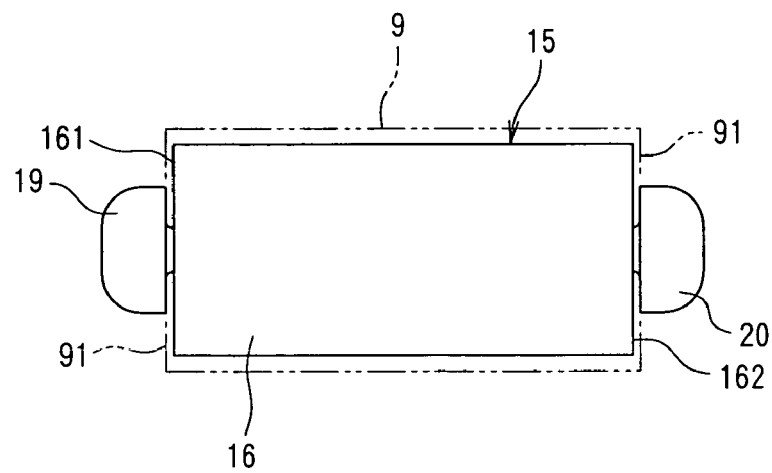
FIG. 4 is a plan view of a retaining piece shown in FIG. 3.
Figure 5:
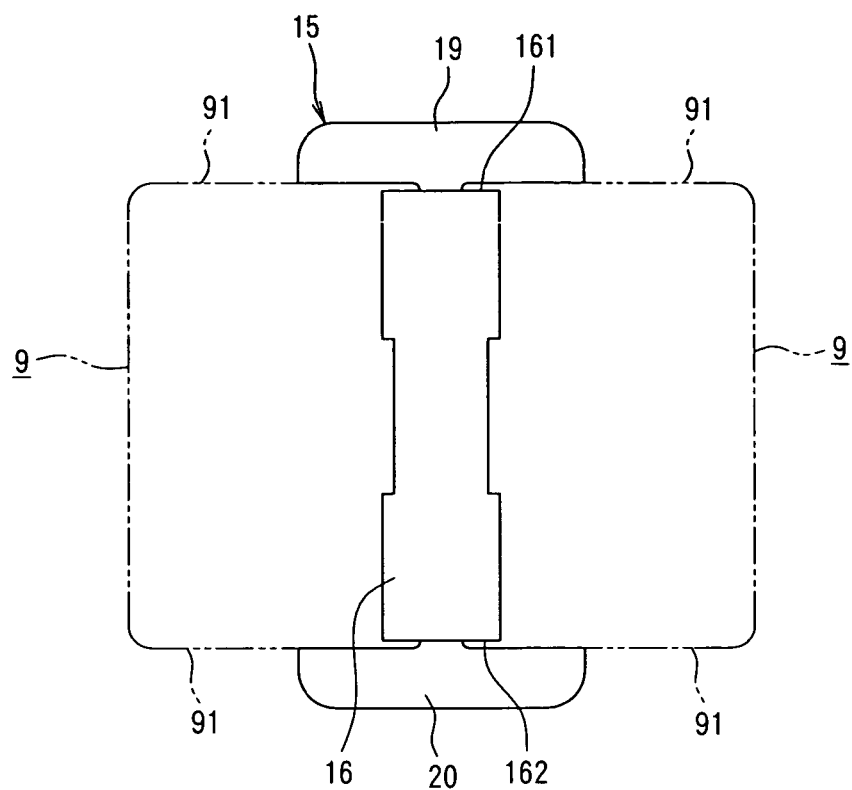
FIG. 5 is a front elevational view of a retaining piece shown in FIG. 3.
Figure 6:
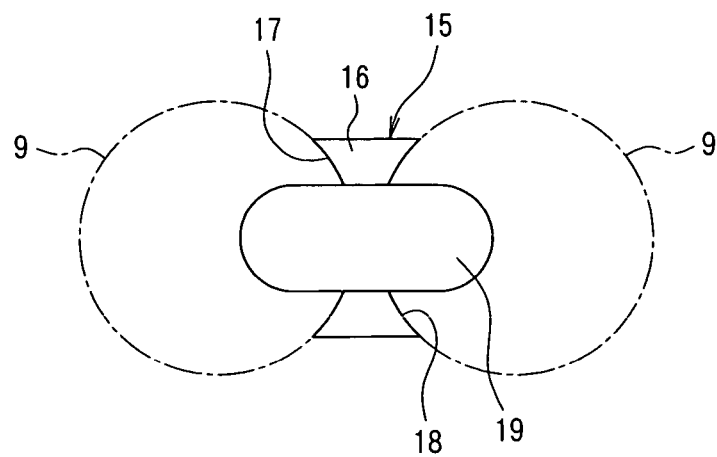
FIG. 6 is a side elevational view of a retaining piece shown in FIG. 3.
Figure 7:
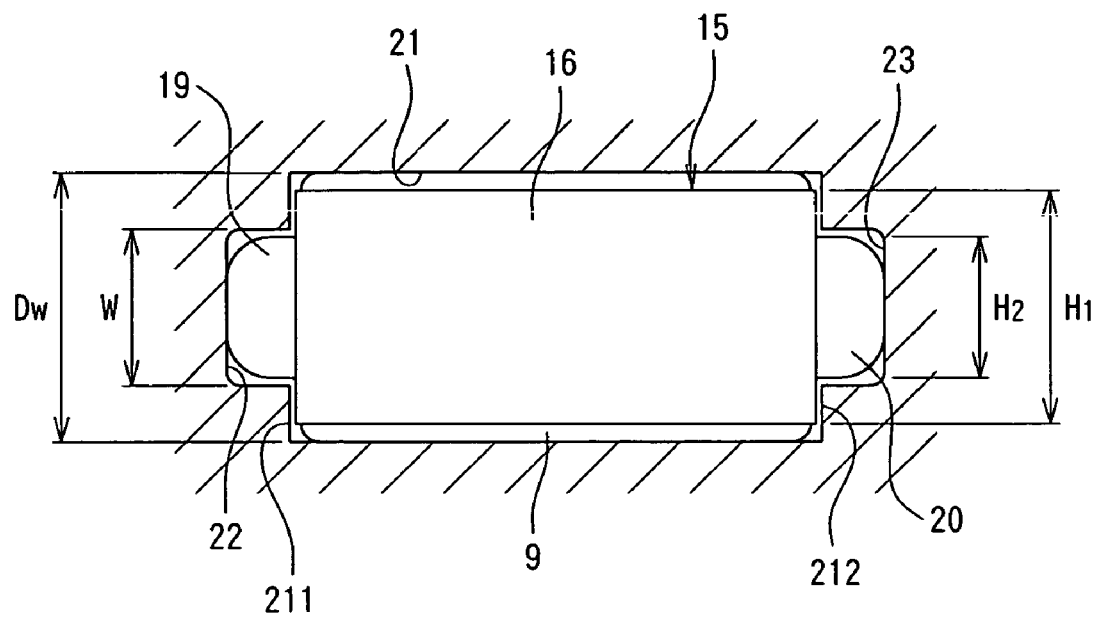
FIG. 7 is a view showing a main portion of the linear guide device shown in FIG. 1
Figure 8:
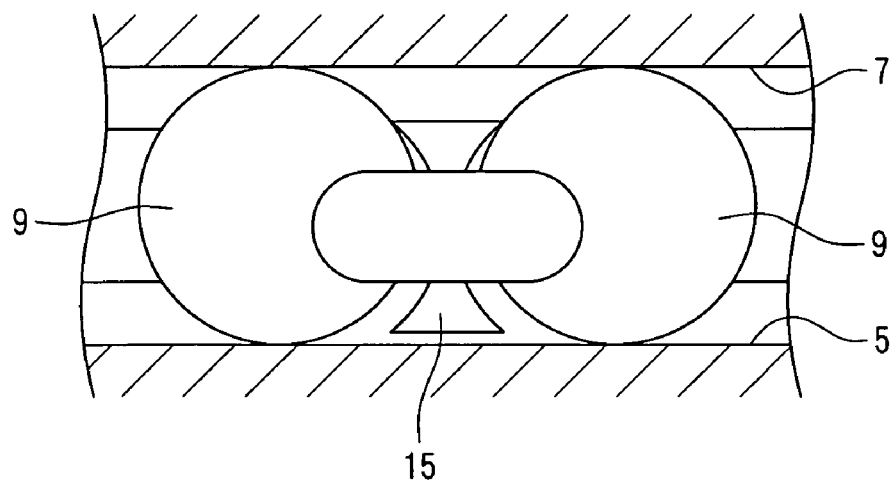
FIG. 8 is a view for explaining the operation of the linear guide device shown in FIG. 1.

Retaining pieces 15 (refer to FIG. 3) formed of a resin material are interposed between each of the rollers 9. Each of the retaining pieces 15, as shown in FIG. 4 and FIG. 5, comprises a retaining piece body 16 having two lateral face portions 161 and 162 in parallel with the end face portion 91 of the roller 9. The retaining piece body 16 is formed with a first roller retaining face 17 for retaining a circumferential surface of one roller 9 of the two adjacent rollers 9 and formed with a second roller retaining face 18 for retaining the circumferential surface of the other roller 9 of the two adjacent rollers 9 as shown in FIG. 6.

Further, the retaining piece 15 has a first arm portion 19 extending from the lateral left face 161 of the retaining piece body 16 toward one of the end face portion 91 of the two adjacent rollers 9 (refer to FIG. 5). A first guide groove 22 for guiding the retaining piece 15 by way of the first arm portion 19 is formed at a central portion of one wall surface 211 of the two opposed wall surfaces 211 and 212 of a circulation channel 21 having the rolling element rolling channel 10, the direction changing channel 11 for rolling elements and the rolling element returning channel 12 (refer to FIG. 7).

Further, the retaining piece 15 has a second arm portion 20 provided to the lateral right face 162 of the retaining piece body 16 in parallel with the first arm portion 19 (refer to FIG. 5). A second guide groove 23 for guiding the retaining piece 15 by way of the second arm portion 20 is formed at a central portion of the other wall surface 212 of the two wall surfaces 211 and 212 of the circulation channel 21 (refer to FIG. 7).

Assuming the diameter of the roller 9 as Dw, the height of the retaining piece body 16 in the direction crossing the axial direction of the roller 9 as H1, the height of the first and second arm portions 19, 21 in the direction crossing the axial direction of the roller 9 as H2, and the width of the first and second guide grooves 22, 23 in the direction crossing the axial direction of the roller 9 as W, the height H1 and H2 of the retaining piece body 16 and the arm portions 19, 20 are set to a height that satisfies the following relation (1).

$$(H1-H2)/2 < (Dw-W)/2 \qquad (1)$$

in which
 $H1 < Dw$
 $H2 < W$

As described above, when the height H1, H2 of the retaining piece body 6 and the height H2 of the arm portions 19, 20 are set to the height that satisfies the relation (1), since the retaining piece 15 is not in contact with the rail-side raceway surface 5 or the slider-side raceway surface 7 even in a case where the distance between two adjacent rollers 9 increases during movement of the slider 2, early wear or deformation of the retaining piece 15 can be suppressed. Further, smooth rolling motion of the roller 9 is not hindered by the contact of the retaining piece 15 with the rail-side raceway surface 5 or the slider-side raceway surface 7, or the retaining function of the retaining piece 16 to the roller 9 is not deteriorated by the wear of the retaining piece 15.

The height H2 of the arm portions 19, 20 of the retaining piece 15 may be lowered and the arm portions of adjacent retaining pieces may be connected in a belt-like manner to connect each of the retaining piece bodies 16 by the arm portions connected in the belt-like manner respectively.

Then, the second embodiment of the invention is to be described with reference to FIG. 9 to FIG. 20.

Figure 9:
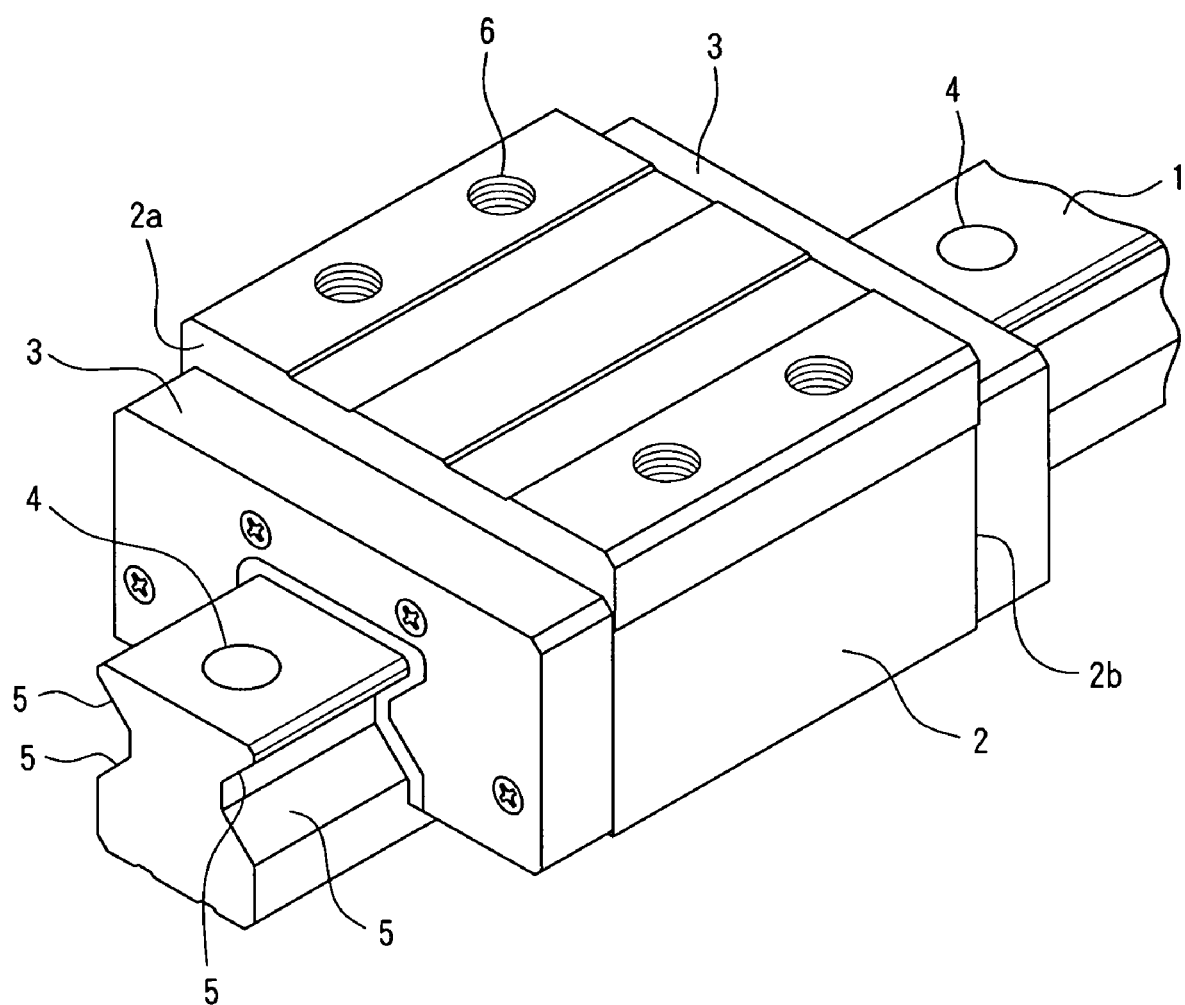
FIG. 9 is a perspective view of a linear guide device according to a second embodiment of the present invention.
Figure 10:
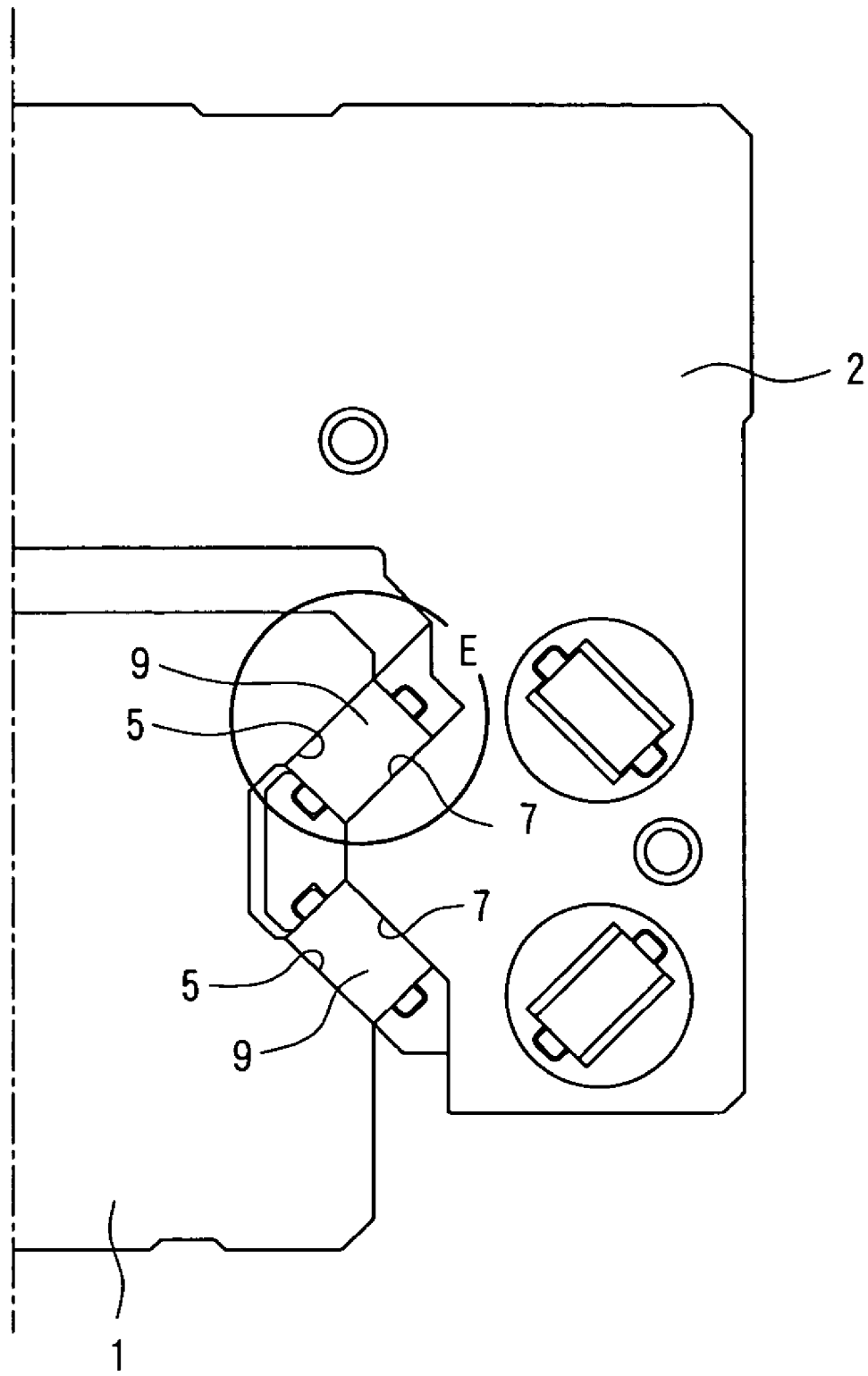
FIG. 10 is a one-half cross sectional view along the lateral direction of the linear guide device shown in FIG. 9.

In FIG. 9, a linear guide device according to the second embodiment of the invention has a rail 1, a slider 2 having a front end face 2a and a rear end face 2b in the longitudinal direction of the rail 1 and two end caps 3 each attached on both end faces 2a and 2b in the front-to-rear direction of the slider 2.

The rail 1 is formed of a steel material such as an alloy steel. Rail attaching holes 4 for securing the rail 1 on a base of a machine tool by means of not illustrated bolts are perforated in an upper surface of the rail 1 each at a predetermined pitch in the longitudinal direction of the rail 1. Further, the rail 1 is formed into a shape similar to an I-shaped configuration for a cross section along the lateral direction of the rail 1. The rail-side raceway surfaces 5 are formed each by two on a lateral left face and a lateral right face of the rail 1 along the longitudinal direction of the rail 1.

The slider 2 is formed of a steel material such as an alloy steel like the rail 1. Threaded holes 6 for securing the slider 2 to a moving bed of a machining tool by means of not illustrated bolts are formed at plural positions in an upper surface of the slider 2. The slider 2 is formed into a shape similar with a saddle for the cross section along the lateral direction of the rail 1. Slider-side raceway surfaces 7 (refer to FIG. 10) are formed each by two to two opposed inner lateral faces of the slider 2 along the longitudinal direction of the rail 1.

The rail-side track way surface 5 and the slider-side track way surface 7 are opposed to each other in which a plurality of rollers 9 are assembled between the rail-side raceway surface 5 and the slider-side raceway surface 7. The rollers 9 are adapted to roll along rolling element rolling channels 10 (refer to FIG. 13) formed between the rail-side raceway surfaces 5 and the slider-side raceway surfaces 7, and then enter direction changing channels 11 for rolling elements formed in the end cap 3 when the slider 2 moves relatively in the longitudinal direction of the rail 1. The direction changing channels 11 for rolling elements are bent into a U-shaped configuration. The rollers 9 that have changed the direction along the direction changing channels 11 for rolling elements return to original position passing through rolling element returning channels 12 (refer to FIG. 13) formed in the slider 2, and then again roll along the path described above repetitively.

Retaining pieces 15 formed of a resin material (refer to FIG. 3) are interposed between each of the rollers 9. Each of the retaining pieces 15 comprise a retaining piece body 16 having two lateral face portions 161 and 162 in parallel with the end face portion 91 of the roller 9. The retaining piece body 16 is formed with a first roller retaining face 17 for retaining a circumferential surface of one roller 9 of the two adjacent rollers 9 and formed with a second roller retaining face 18 for retaining the circumferential surface of the other roller 9 of the two adjacent rollers 9 as shown in FIG. 12.

Figure 11:
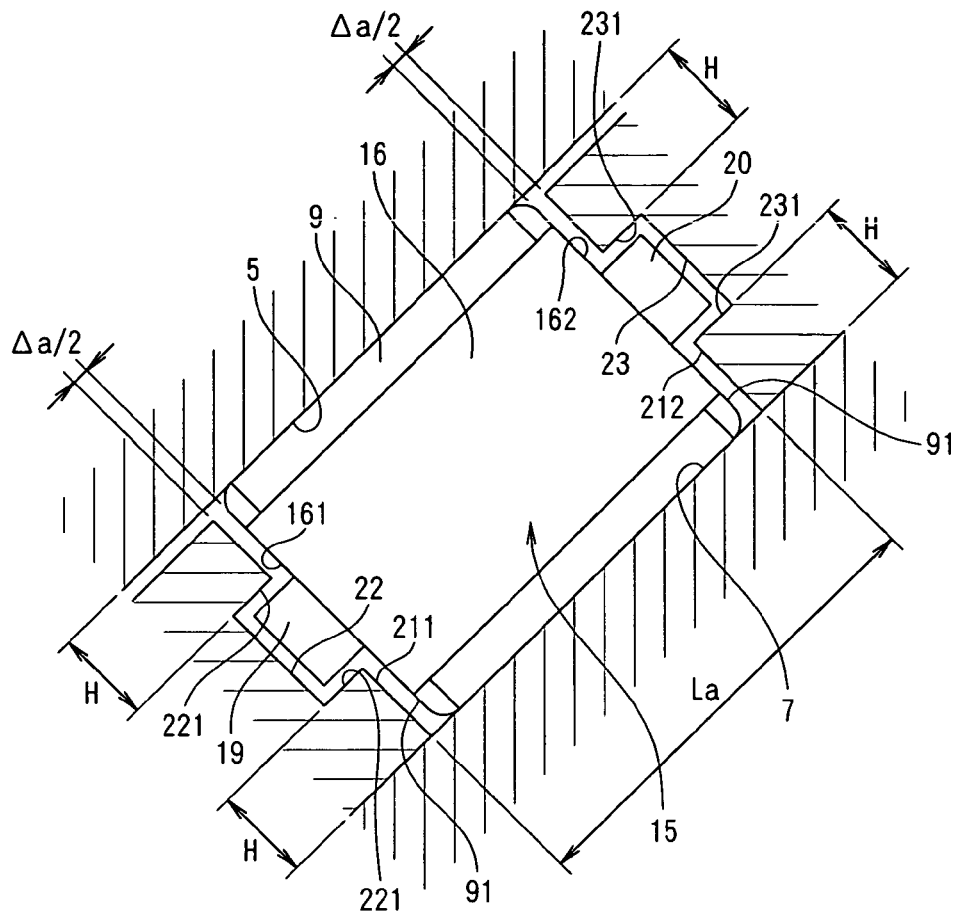
FIG. 11 is an enlarged view at a portion E in FIG. 10.
Figure 12:
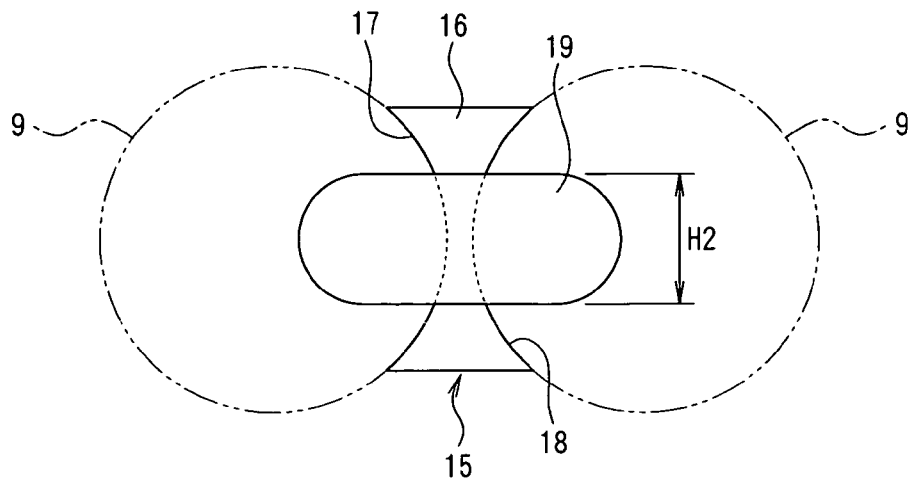
FIG. 12 is a side elevational view of the retaining piece shown in FIG. 10.
Figure 13:
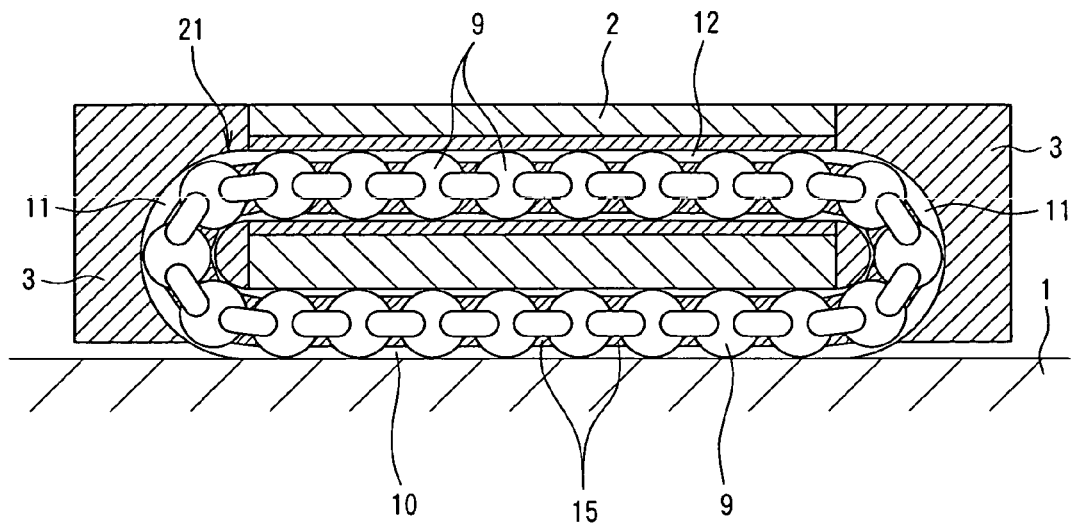
FIG. 13 is a view showing a circulation channel of the linear guide device shown in FIG. 9.

Further, the retaining piece 15 has a first arm portion 19 extending from the lateral left face 161 of the retaining piece body 16 toward the end face portion 91 of the two adjacent rollers 9 (refer to FIG. 12). A first guide groove 22 for guiding the retaining piece 15 by way of the first arm portion 19 is formed at a central portion of one wall surface 211 of the two opposed wall surfaces 211 and 212 of a circulation channel 21 having the rolling element rolling channel 10, the direction changing channel 11 for rolling elements and the rolling element returning channel 12 (refer to FIG. 11).

Further, the retaining piece 15 has a second arm portion 20 provided to the lateral right face 162 of the retaining piece body 16 in parallel with the first arm portion 19 (refer to FIG. 11). A second guide groove 23 for guiding the retaining piece 15 by way of the second arm portion 20 is formed at a central portion of the other wall surface 212 of the two wall surfaces 211 and 212 of the circulation channel 21 (refer to FIG. 11).

Assuming the diameter of the roller 9 as Dw, and the height of the first and second arm portions 9, 20 in the direction crossing the axial direction of the roller 9 as H2, the height H2 of the arm portions 19, 21 are set to the height that satisfies the following relation (2):

$$0.2 \leq H2/Dw \leq 0.5 \qquad (2)$$

The operation of the linear guide device constituted as described above is to be described with reference to FIG. 14 to FIG. 20.

Figure 14:
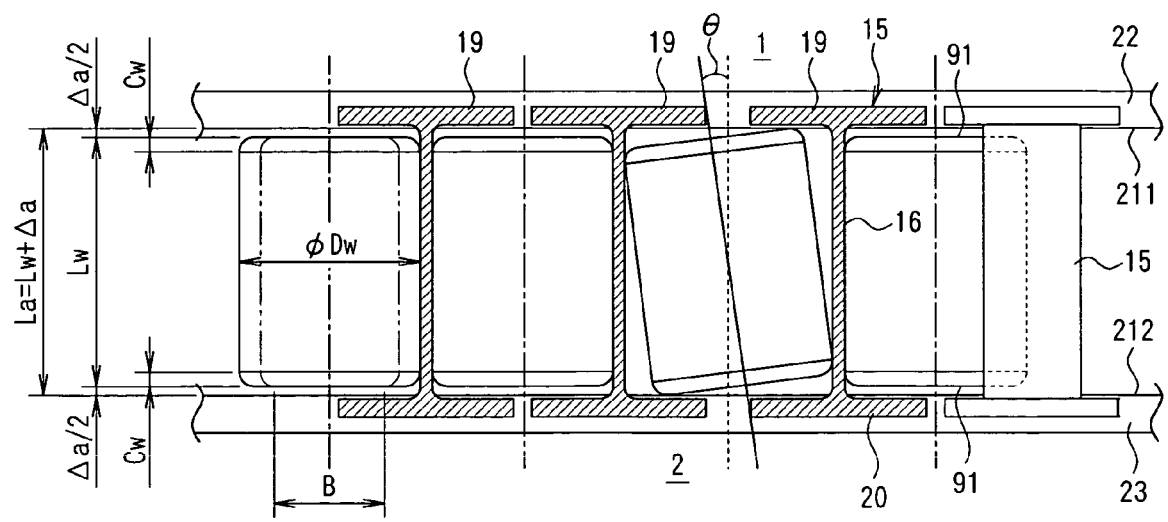
FIG. 14 is a view for explaining the rolling state of rollers shown in FIG. 13.
Figure 15:
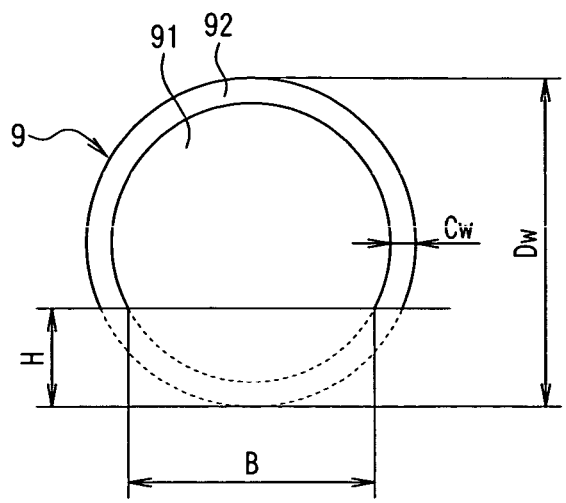
FIG. 15 is a view showing a maximum contact length between the end face portion of a roller and a lateral face portion of the circulation channel shown in FIG. 13.

As shown in FIG. 14, assuming the diameter of the roller 9 as Dw, the length of chamfered portion 92 (refer to FIG. 15) formed at the boundary between the circumferential surface and the end face of the roller 9 as Cw, and the height of the inner wall surface of the circulation channel measured from the slider-side raceway surface 7 in the vertical direction thereof (hereinafter referred to as "circulation channel inner wall surface height") as H, the maximum contact length B between the end face portion 91 of the roller 9 and the lateral faces 211, 212 of the circulation channel 21 can be geometrically determined according to the following equation:

$$B = 2((Dw/2 - Cw)^2 - (Dw/2 - H)^2)^{0.5} \qquad (3)$$

Further, assuming the axial length of the roller 9 as Lw and the distance between the lateral right face 211 and the lateral left face 212 of the circulation channel 21 as La, the axial gap Δa between the roller end faces 91 and the circulation channel 21 can be determined by the following equation:

$$\Delta a = La - Lw \qquad (4)$$

Figure 16:
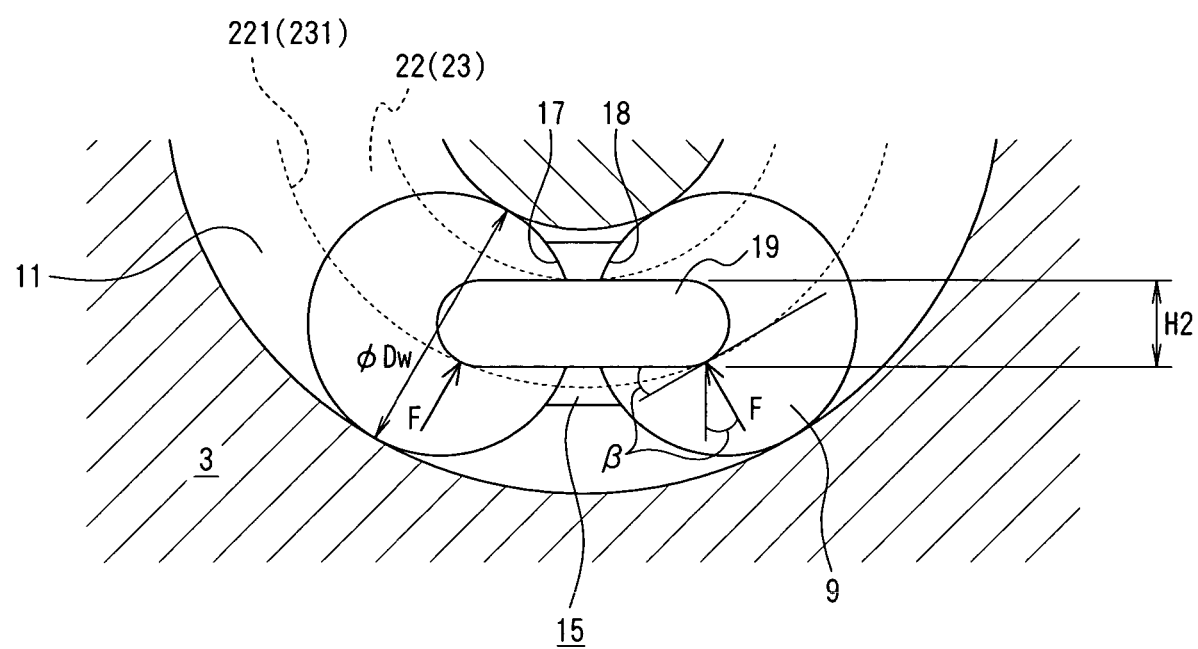
FIG. 16 is an enlarged view for a direction changing channel shown in FIG. 13.
Figure 17:
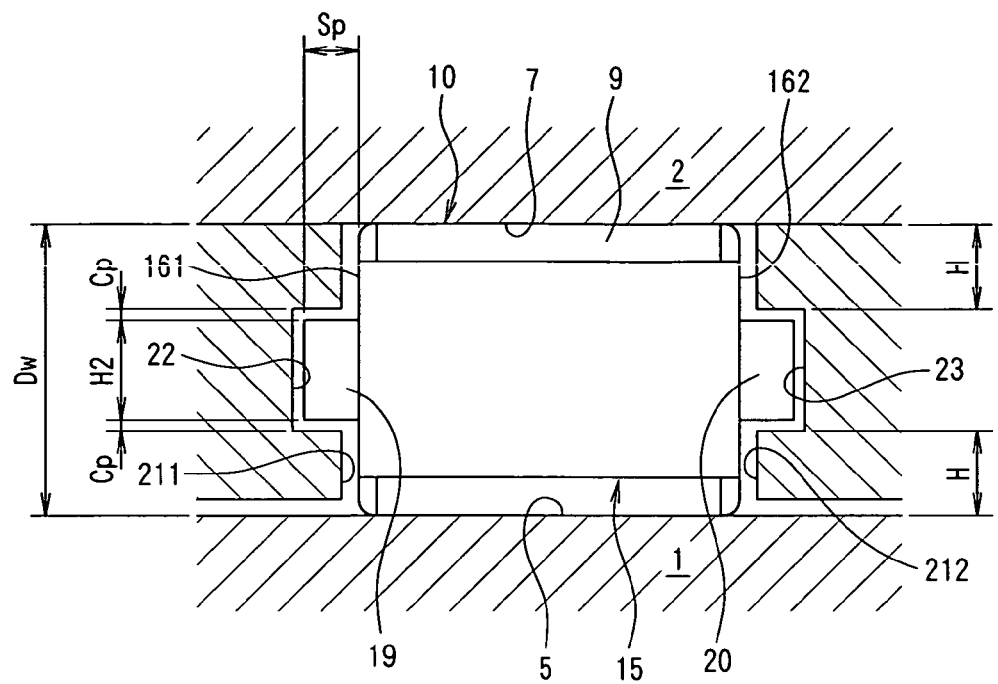
FIG. 17 is a cross sectional view along the lateral direction of a rolling element rolling channel shown in FIG. 13.

In such a circulation channel 21, a maximum skew angle θ in a case where the roller 9 causes skew and the roller 9 abuts against the wall surface of the circulation channel 21 as shown in FIG. 16 is expressed approximately according to the following equation:

$$\theta = \Delta a/B \text{ (radian)} \qquad (5)$$

Then, the maximum stress σ generated in the arm portions 19, 20 when the retaining piece 15 moves in the direction changing channel 11 is to be explained with reference to FIG. 16.

As shown in FIG. 16, assuming the force that exerts on the arm portion 19, 20 of the retaining piece 15 from outer circumferential guide groove walls 221, 231 of the guide grooves 22, 23 in the direction changing channel 11 for rolling elements of the end cap 3 as F, angle of contact between the arm portions 19, 20 and the guide grooves 22, 23 at the point of contact where the end of the arm portion 19, 20 is in contact with the guide grooves walls 221, 231 of the guide groove 22, 23 as β, and the axial length of the arm portions 19, 20 as Sp, the maximum stress σ generated in the arm portions 19 to 20 can be determined-approximately according to the following equation:

$$\sigma = 3Dw \cdot F \sin \beta / (Sp \cdot H2^2) \qquad (6)$$

Figure 18:
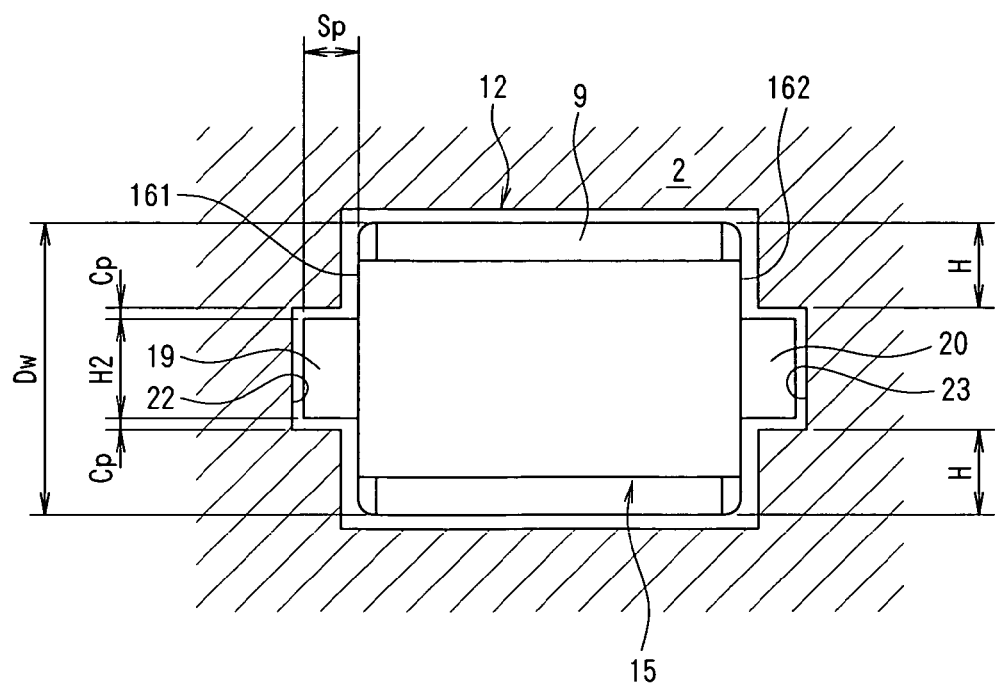
FIG. 18 is a cross sectional view along the lateral direction of a rolling element returning channel shown in FIG. 13.

Then, assuming the size of the gap formed between the guide walls on both side of the guide grooves 22, 23 and the arm portion 19, 20 in the rolling element rolling channel 10 as Cp, the relation according to the following equation is established between the diameter Dw of the roller 9 and the gap Cp, and the same relation is established also in the case of the rolling element returning channel 12 shown in FIG. 18.

$$Dw = 2H + 2Cp + H2 \quad (7)$$

Figure 19:
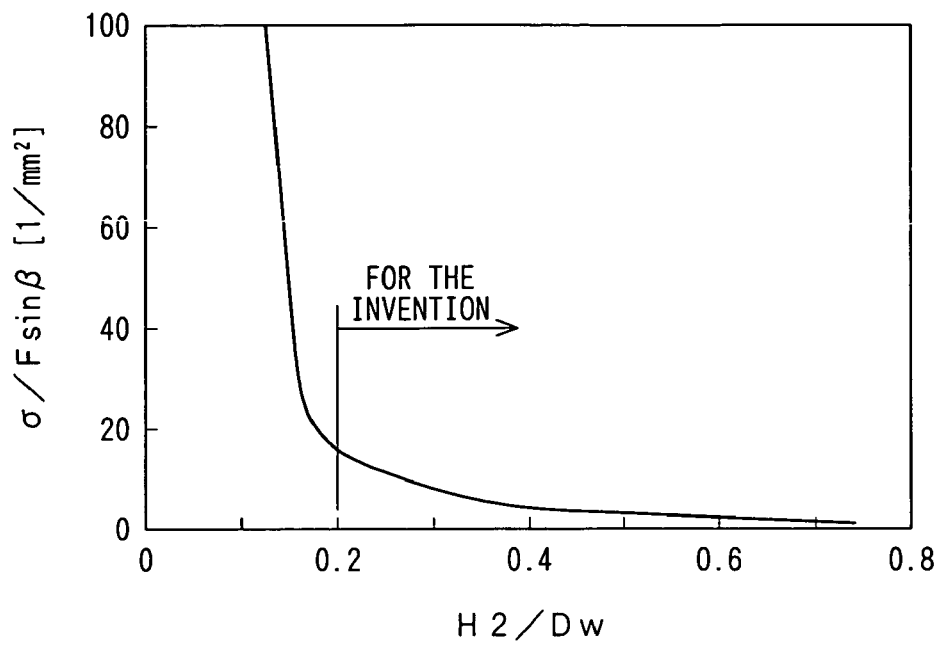
FIG. 19 is a graph showing a relation between the maximum stress generated to an arm portion of a retaining piece when rollers are skewed and a ratio of roller diameter relative to the height of the arm portion.
Figure 20:
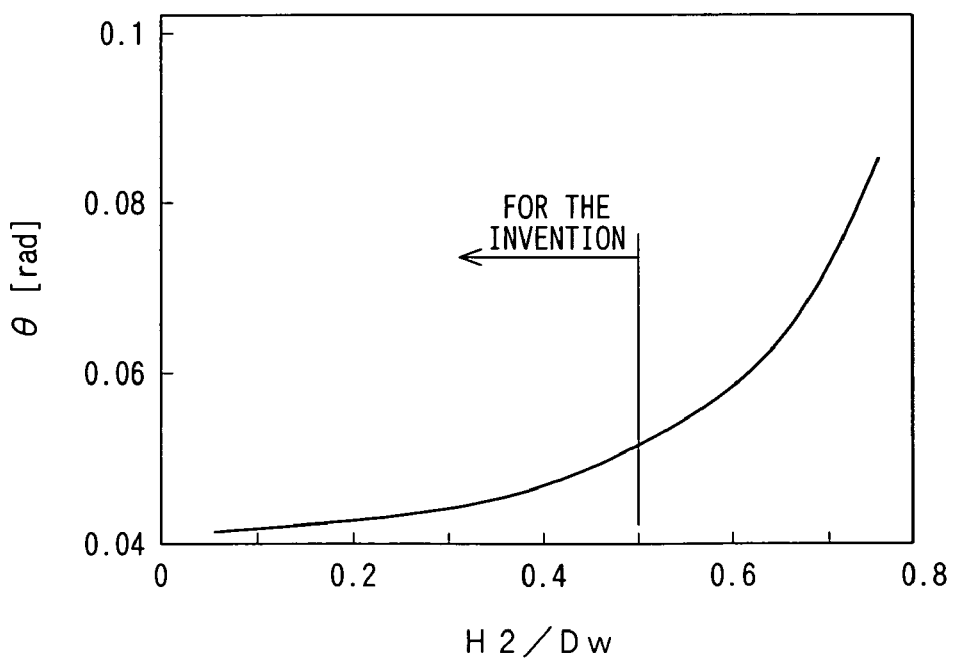
FIG. 20 is a graph showing a relation between the maximum skew angle of a roller and a roller diameter ratio relative to the height of the arm portion.

FIG. 19 and FIG. 20 show the result of examining the relation between the height H2 of the arm portions 19, 20 and the maximum stress σ and the skew angle θ by using a linear guide device, with roller diameter: Dw=5.5 mm, roller axial length: Lw=8 mm, roller chamfered length: Cw=0.3 mm, inter guide groove distance: La=8.2 mm, arm portion length: Sp=0.8 mm, gap between arm portion and guide groove: Cp=0.1 mm, and roller row: 4 row.

As shown in FIG. 19, the maximum stress α can be decreased effectively in a case where H2/Dw which is the ratio between the height of the arm portions 19, 20 and the diameter Dw of the roller 9 is 0.2 or more. Further, as shown in FIG. 20, the skew angle θ of the roller 9 can be suppressed effectively when H2/Dw is 0.5 or less.

The height H of the inner wall surface of the circulation channel can be determined according to the following equation, which is changed along with the change of the height H2 of the arm portion 19, 20:

$$H = (Dw - 2Cp - H2)/2 \quad (7)$$

As apparent from the foregoing description, by defining the height H2 of the first and the second arm portions 19, 20 to a height that satisfies the conditional relation: $0.2 \leq H2/Dw \leq 0.5$, skew of the roller 9 at a large angle can be suppressed, and increase of the moving resistance of the slider 2 by the frictional force F caused to the contact portion between the arm portions 19, 20 and guide grooves 22, 23 when the roller 9 roll along the direction changing channel 11 for rolling elements in the end cap 3 can be suppressed.

Further, by defining the ratio H2/Dw between the height H2 of the arm portions 19, 20 and the diameter Dw of the roller 9 to 0.5 or less, the skew angle when skew is caused to the roller 9 can be made appropriate to suppress wear by the slipping friction. Furthermore, by defining the ratio H2/Dw between the height H2 of the arm portions 19, 20 and the diameter Dw of the roller 9 to 0.2 or more and 0.5 or less, damage to the arm portions 19, 20 of the retaining piece can be prevented.

Then, the third embodiment of the invention is to be described with reference to FIG. 21 to FIG. 29.

Figure 21:
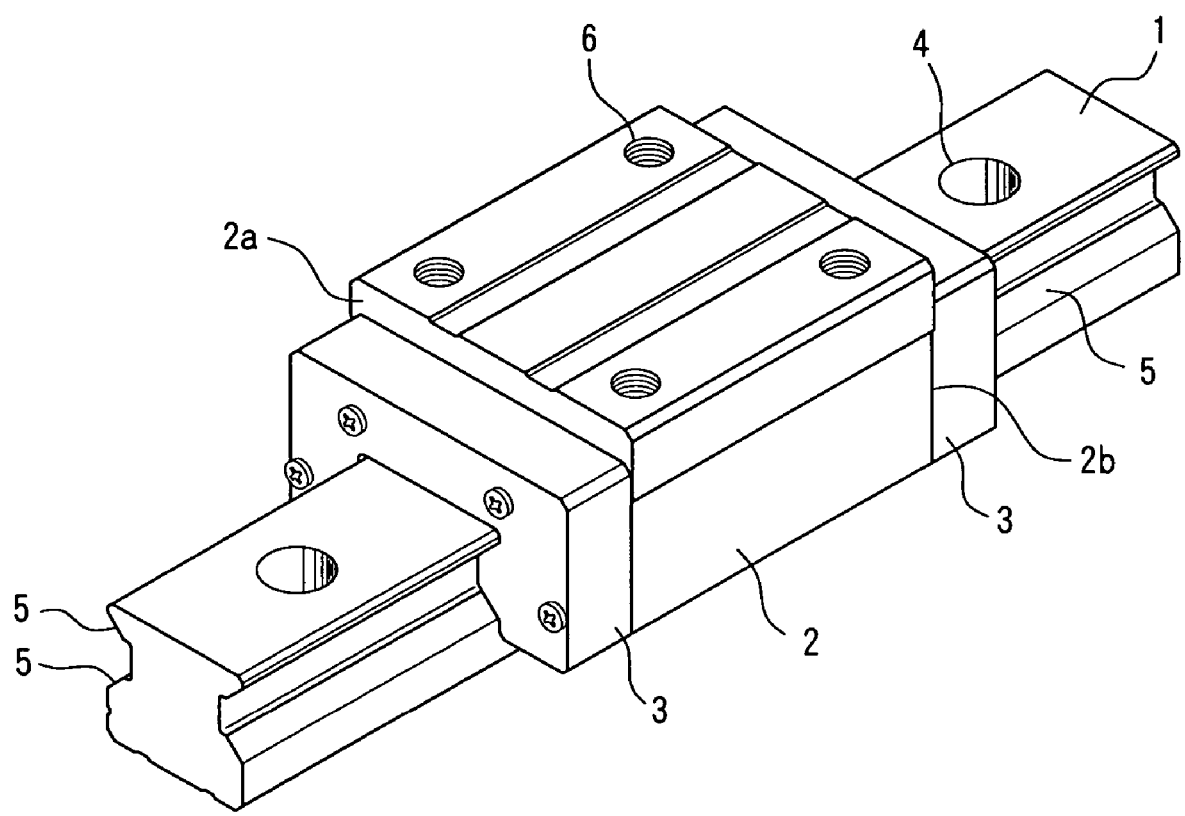
FIG. 21 is a perspective view of a linear guide device according to a third embodiment of the present invention.
Figure 22:
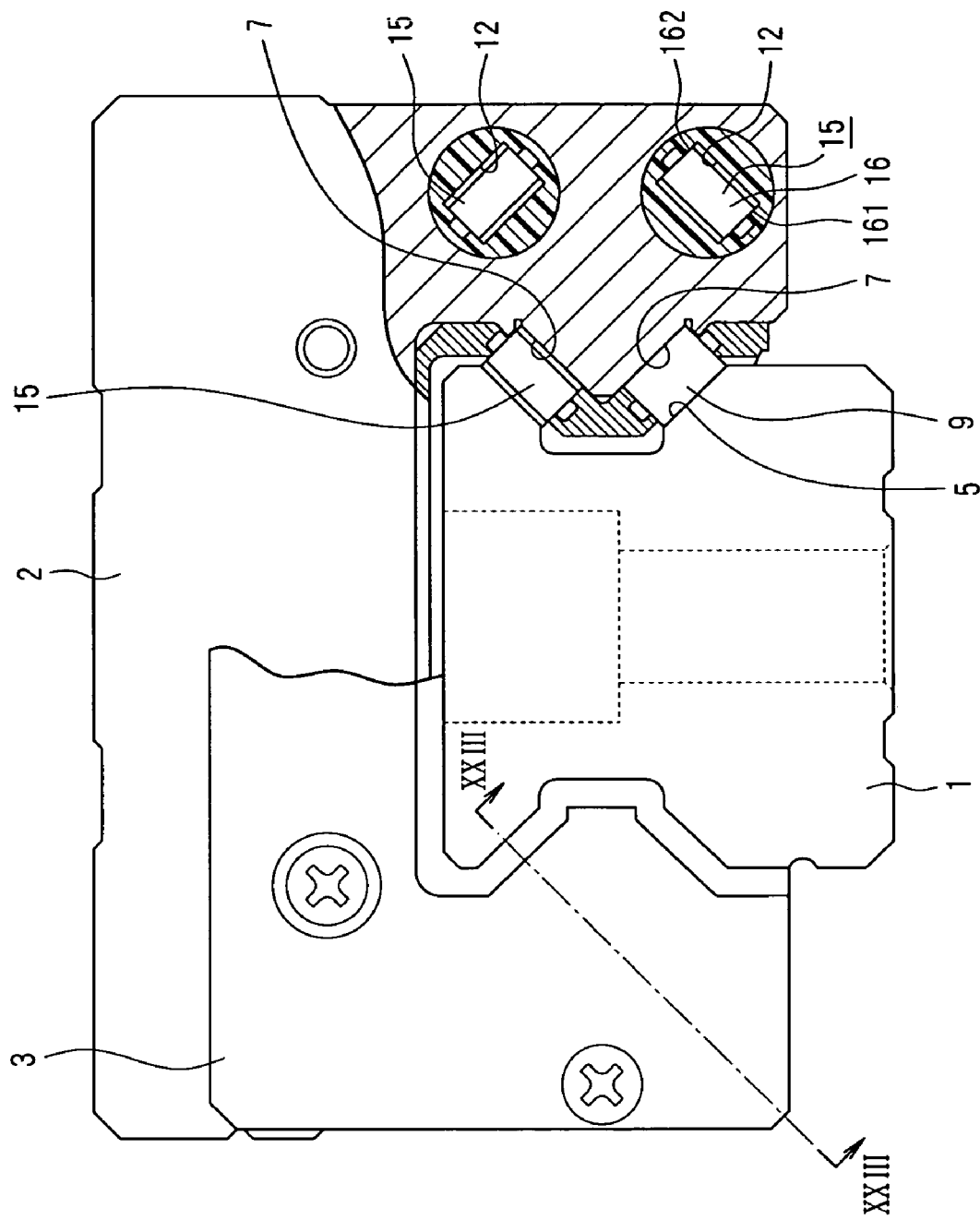
FIG. 22 is a front elevational view of the linear guide device shown in FIG. 21.
Figure 23:
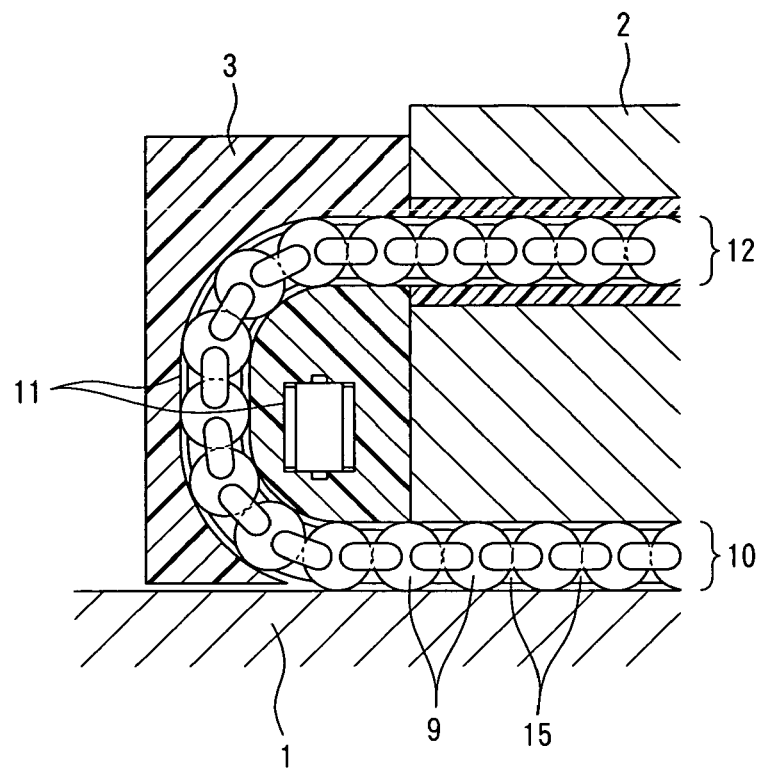
FIG. 23 is a XXIII-XXIII cross sectional view of FIG. 22.

In FIG. 21, a linear guide device according to the third embodiment of the invention has a rail 1, a slider 2 having a front end face 2a and a rear end face 2b in the longitudinal direction of the rail 1 and two end caps 3 each attached on both end faces 2a and 2b in the front-to-rear direction of the slider 2.

The rail 1 is formed of a steel material such as an alloy steel. Rail attaching holes 4 for securing the rail 1 on a base of a machine tool by means of not illustrated bolts are perforated in an upper surface of the rail 1 each at a predetermined pitch in the longitudinal direction of the rail 1. Further, the rail 1 is formed into a shape similar to an I-shaped configuration for a cross section along the lateral direction of the rail 1. The rail-side raceway surfaces 5 are formed each by two on a lateral left face and a lateral right face of the rail 1 along the longitudinal direction of the rail 1.

The slider 2 is formed of a steel material such as an alloy steel like the rail 1. Threaded holes 6 for securing the slider 2 to a moving bed of a machining tool by means of not illustrated bolts are formed at plural positions in an upper surface of the slider 2. The slider 2 is formed into a shape similar with a saddle for the cross section along the lateral direction of the rail 1. Slider-side raceway surfaces 7 (refer to FIG. 22) are formed each by two to two opposed inner lateral faces of the slider 2 along the longitudinal direction of the rail 1.

The rail-side track way surface 5 and the slider-side track way surface 7 are opposed to each other in which a plurality of rollers 9 are assembled between the rail-side raceway surface 5 and the slider-side raceway surface 7. The rollers 9 are adapted to roll along rolling element rolling channels 10 (refer to FIG. 23) formed between the rail-side raceway surfaces 5 and the slider-side raceway surfaces 7 and then enter a direction changing channels 11 for rolling elements formed in the end cap 3 when the slider 2 moves relatively in the longitudinal direction of the rail 1. The direction changing channels 11 for rolling elements are bent into a U-shaped configuration. The rollers 9 that have changed the direction along the direction changing channels 11 for rolling elements return to original position passing through rolling element returning channels 12 (refer to FIG. 23) formed in the slider 2 and then again roll along the path described above repetitively.

Figure 24:
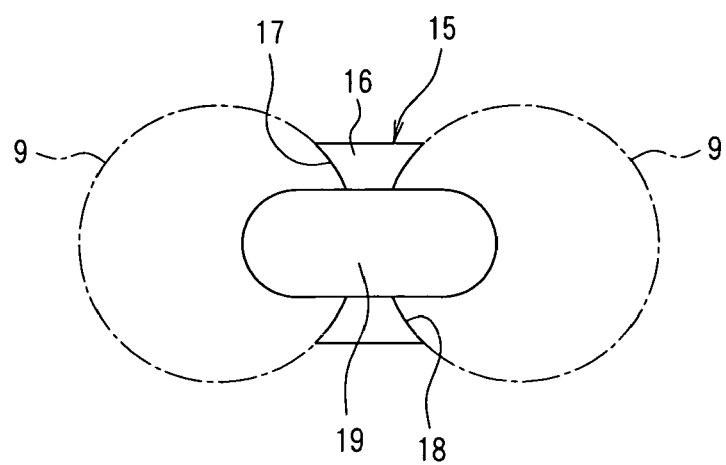
FIG. 24 is a side elevational view of a retaining piece shown in FIG. 23.
Figure 25:
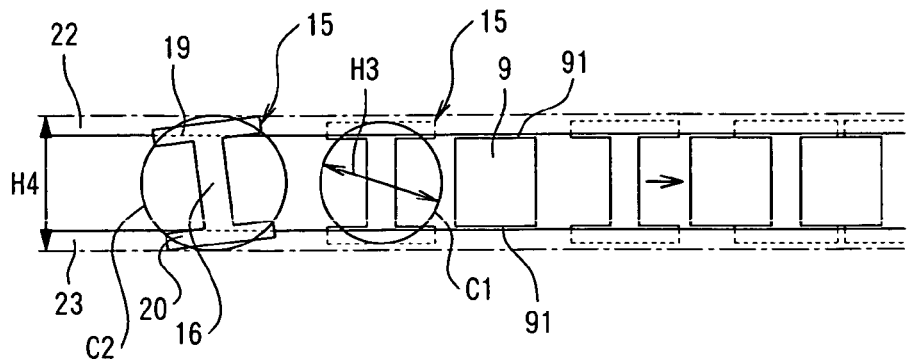
FIG. 25 is a view showing a main portion of the linear guide device shown in FIG. 21.

Retaining pieces 15 (refer to FIG. 23) formed of, for example, an elastomer material are interposed between each of the rollers 9. Each of the retaining pieces 15 comprise a retaining piece body 16 having two lateral face portions 161 and 162 in parallel with the end face portion 91 of the roller 9 (refer to FIG. 25). The retaining piece body 16 is formed with a first roller retaining face 17 for retaining a circumferential surface of one roller 9 of the two adjacent rollers 9 and formed with a second roller retaining face 18 for retaining the circumferential surface of the other roller 9 of the two adjacent rollers 9 as shown in FIG. 24.

Figure 26:
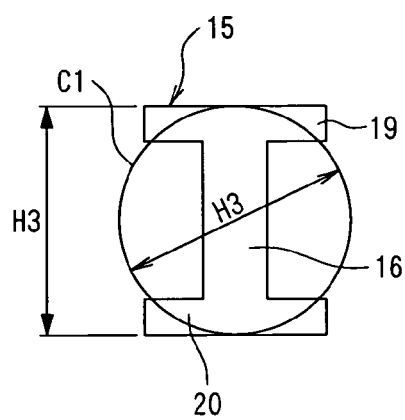
FIG. 26 is a view for explaining dimensional conditions of a retaining piece shown in FIG. 25.

Further, the retaining piece 15 has a first arm portion 19 extending from the lateral left face 161 of the retaining piece body 16 toward the end face portion 91 of the two adjacent rollers 9 (refer to FIG. 26). A first guide groove 22 for guiding the retaining piece 15 by way of the first arm portion 19 is formed at a central portion of one wall surface 211 of the two opposed wall surfaces 211 and 212 of a circulation channel 21 having the rolling element rolling channel 10, the direction changing channel 11 for rolling elements and the rolling element returning channel 12 (refer to FIG. 25).

Further, the retaining piece 15 has a second arm portion 20 provided to the lateral right face 162 of the retaining piece body 16 in parallel with the first arm portion 19 (refer to FIG. 16). A second guide groove 23 for guiding the retaining piece 15 by way of the second arm portion 20 is formed at a central portion of the other wall surface 212 of the two wall surfaces 211 and 212 of the circulation channel 21 (refer to FIG. 25).

Assuming the distance between an outer lateral face of the first arm portion 19 and an outer lateral face of the second arm portion 20 as H3, the length of the first and the second arm portions 19, 20 is defined as such a length that the both ends of the first and the second arm portions 19, 20 are situated to the outside of a circle C1 having a center at the central portion of the retaining piece body 16 and having a diameter H3 as shown in FIG. 26.

Figure 27:
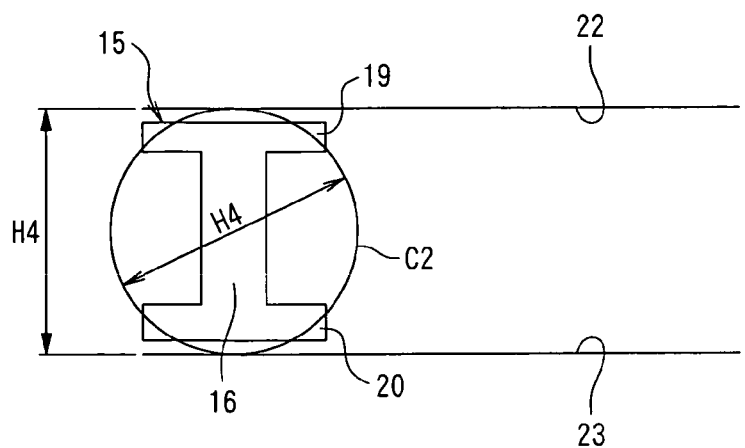
FIG. 27 is a view for explaining the dimensional condition between guide grooves shown in FIG. 25.

Further, assuming the distance between a bottom of the first guide groove 22 and a bottom of the second guide groove 23 as H4, the length of the first and the second arm portions 19, 20 is defined as such a length that the both ends of the first and the second arm portions 19, 20 are situated to the outside of a circle C1 having a center at the central portion of the rolling element rolling channel 10 and having a diameter H4 as shown in FIG. 27.

Figure 28:
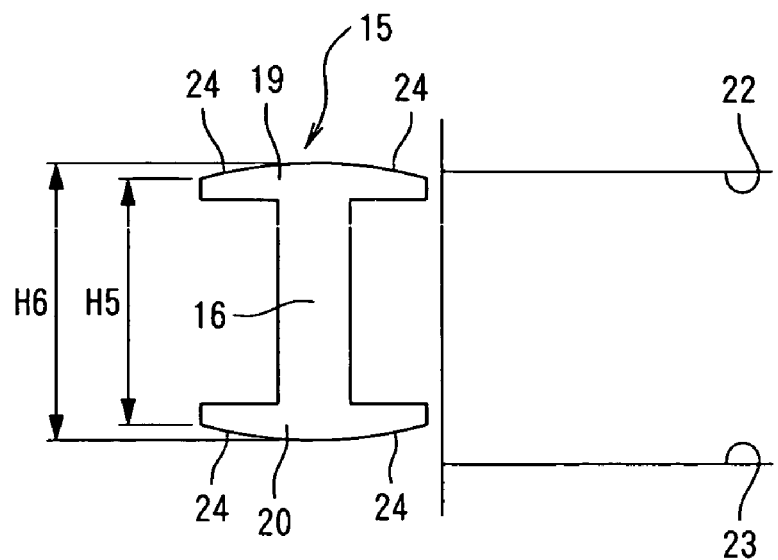
FIG. 28 is a view for explaining dimensional conditions for the end of the outer lateral face of the arm portion and the central portion on the outer lateral face of the arm portion of a retaining piece shown in FIG. 25.

Further, the end portion of the outer lateral face of the first and the second arm portions 19, 20 forms an arcuate face 24 convex to the bottom of the first and the second guide grooves 22, 23 as shown in FIG. 28, by which the distance H5 between the end of the outer lateral face of the first arm portion 19 and the end of the outer lateral face of the second arm portion 20 relative to the distance H6 between the central portion of the outer lateral face of the first arm portion 19 and central portion of the outer lateral face of the second arm portion 20 is in a relation: H5<H6.

Figure 29:
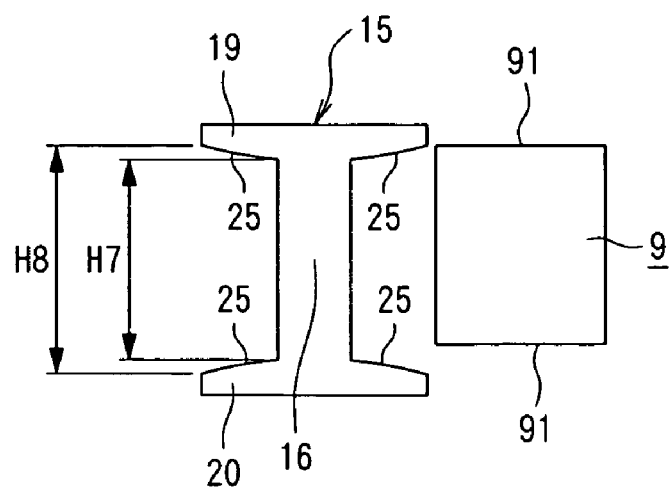
FIG. 29 is a view for explaining dimensional conditions For the end of the inner lateral face of the arm portion and the central portion on the inner lateral face of the arm portion of a retaining piece shown in FIG. 25.

Further, an end portion of an inner lateral face of the first and the second arm portions 19, 20 forms an arcuate face 25 convex to the end face portion 91 of the roller 9 as shown in FIG. 29, by which the distance H7 between the end of the inner lateral face of the first arm portion 19 and the end of the inner lateral face of the second arm portion 20 relative to the distance H8 between the central portion of the inner lateral face of the first arm portion 19 and the central portion of the inner lateral face of the second arm portion 20 is in a relation: H7<H8.

As described above, by defining the length of the first and the second arm portions 19, 20 to such a length that the both ends of the first and the second arm portions 19, 20 are situated to the outside of the circle C1 and the circle C2, since turn down of the retaining piece 15 can be prevented upon assembling the linear guide device by assembling the rollers 9 and the retaining pieces 15 alternately, for example, in the rolling element rolling channel 10, the rolling element returning channel 12, etc., the linear guide device can be assembled efficiently and the assembling cost of the linear guide device can be decreased.

Further, since the end portion of the outer lateral face of the first and the second arm portions 19, 20 forms an arcuate face 24 convex to the bottom of the first and the second guide grooves 22, 23, when rollers 9 and the retaining pieces 15 are assembled, for example, in the rolling element rolling channel 10 or the rolling element returning channel 12, the arm portions 19, 20 of the retaining piece 15 are not caught by the end of the slider 2. Accordingly, turn down of the retaining piece 15 can be suppressed and the rollers 9 and the retaining pieces 15 can be assembled easily into the rolling element returning channel 12 or the rolling element rolling channel 10, as well as the damage of the arm portions 19, 20 can be prevented and, as a result, the assembling operation for the linear guide device can be conducted efficiently with no worry for the turn down of the retaining piece 15, and the assembling cost can be reduced further.

Further, in the third embodiment, since the end portion of the inner lateral face of the first and the second arm portions 19, 20 is formed as an arcuate face 25 convex to the end face portion 91 of the roller 9, when the rollers 9 and the retaining pieces 15 are assembled into the rolling element returning channel 12 or the rolling element rolling channel 10, the retaining piece 15 can be prevented from turning down even when the end of the arm portions 19, 20 should be in contact with the roller 9. Accordingly, since the rollers 9 and the retaining pieces 15 can be easily assembled into the rolling element returning channel 12 or the rolling element rolling channel 10, as well as the damage of the arm portions 19, 20 can be prevented, the assembling operation of the linear guide device can be conducted efficiently with no worry for the turning down of the retaining pieces 15, and the assembling cost can be decreased further.

In the third embodiment described above, while the elastomer was used as a material for the retaining piece for suppressing swelling of a lubricant and an anti-rusting agent, swelling of the lubricant or the anti-rusting agent can be suppressed also by using an engineering plastic material such as PA66 for the material of the retaining piece. Further, a plastic material containing solid oils and fats may also be used as a material for the retaining piece in order to improve the slipping performance between each of the resin materials.

Figure 30:
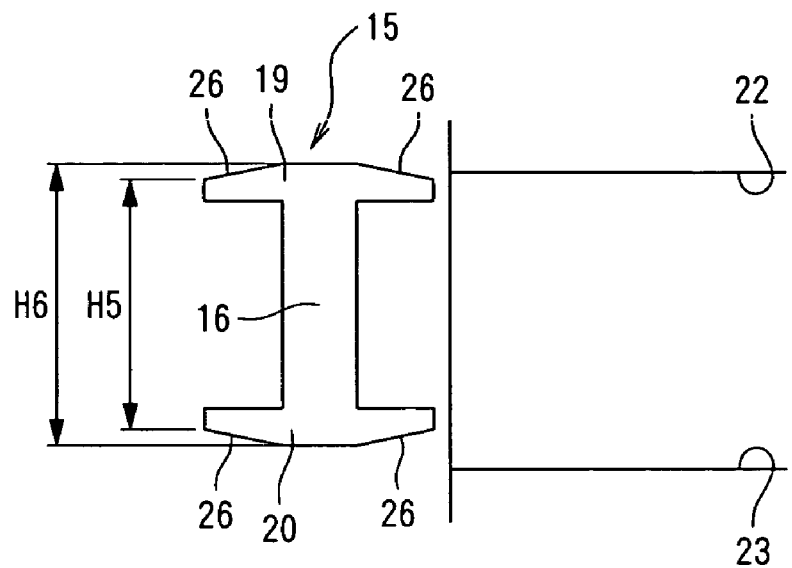
FIG. 30 is a view showing a modified embodiment of a retaining piece in which the outer lateral face end of the arm portion is formed as a tapered face.
Figure 31:
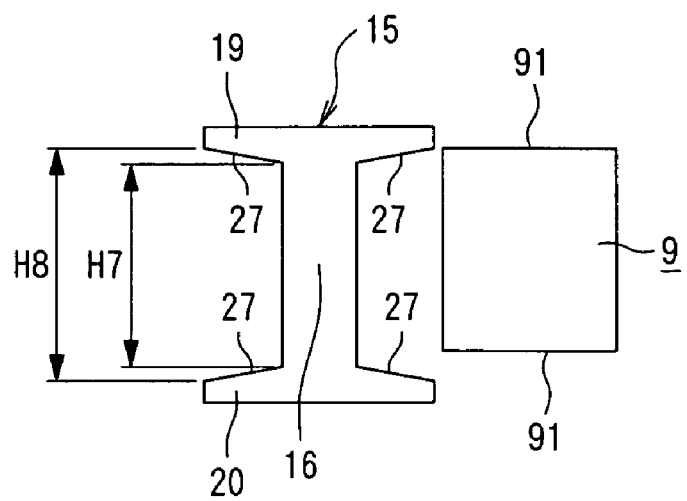
FIG. 31 is a view showing a modified embodiment of a retaining piece in which the inner lateral face end of the arm portion is formed as a tapered face.

Further, in the third embodiment, while the end portion of the outer lateral face of the first and the second arm portions 19, 20 is formed to an arcuate face 22 convex to the bottom of the first and the second guide grooves 22, 23, the end face of the outer lateral face of the first and the second arm portions 10, 20 may be formed as a tapered face 26 relative to the bottom of the first and the second guide grooves 22, 23 as shown in FIG. 30. Further, in the third embodiment, while the end portion of the inner lateral face of the first and the second arm portions 19, 20 is formed as an arcuate face 25 convex to the bottom of the first and the second guide grooves 22, 23, the end portion of the inner lateral face of the first and the second arm portions 19, 20 may be formed as a tapered face 27 relative to the bottom of the first and the second guide grooves 22, 23 as shown in FIG. 31.

Then, the fourth embodiment of the invention is to be described with reference to FIG. 32 to FIG. 37.

Figure 32:
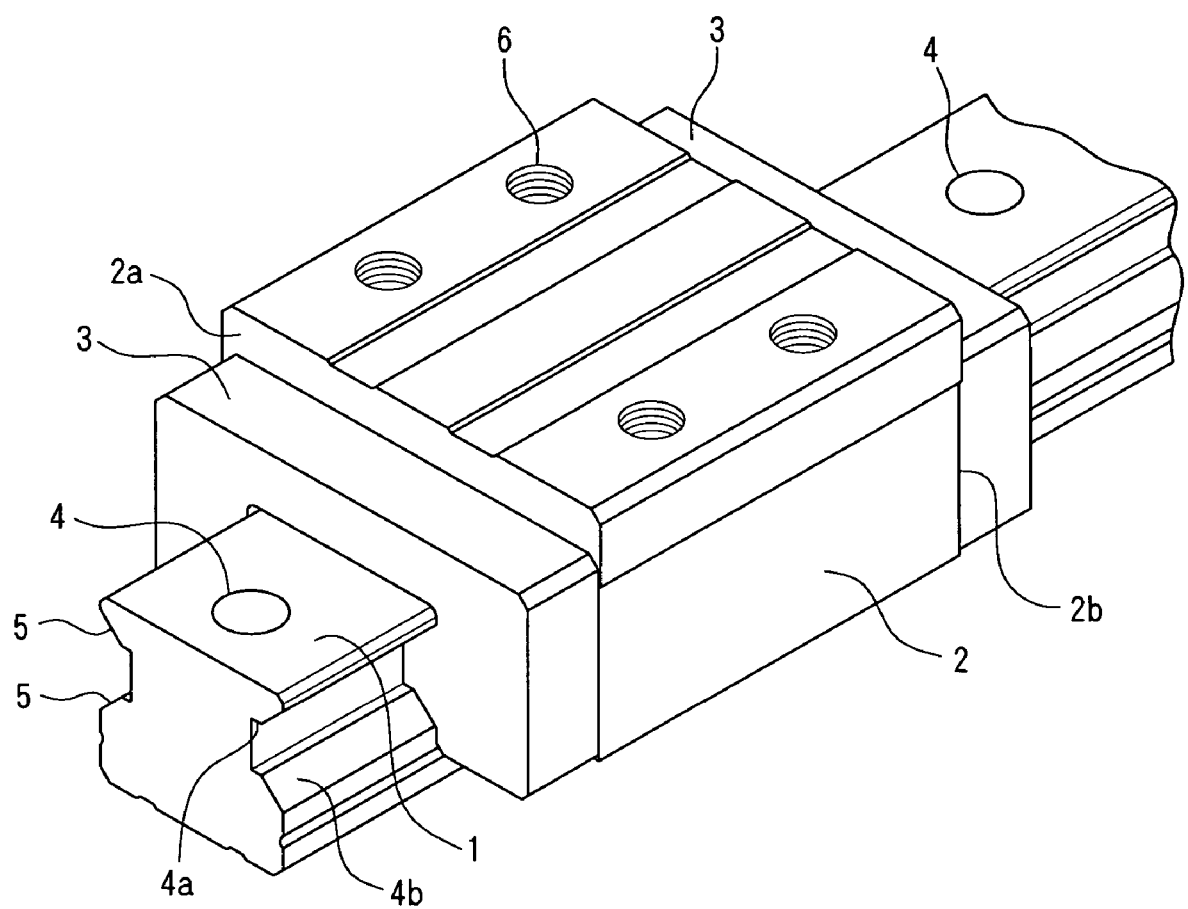
FIG. 32 is a perspective view of a linear guide device according to a fourth embodiment of the present invention.
Figure 33:
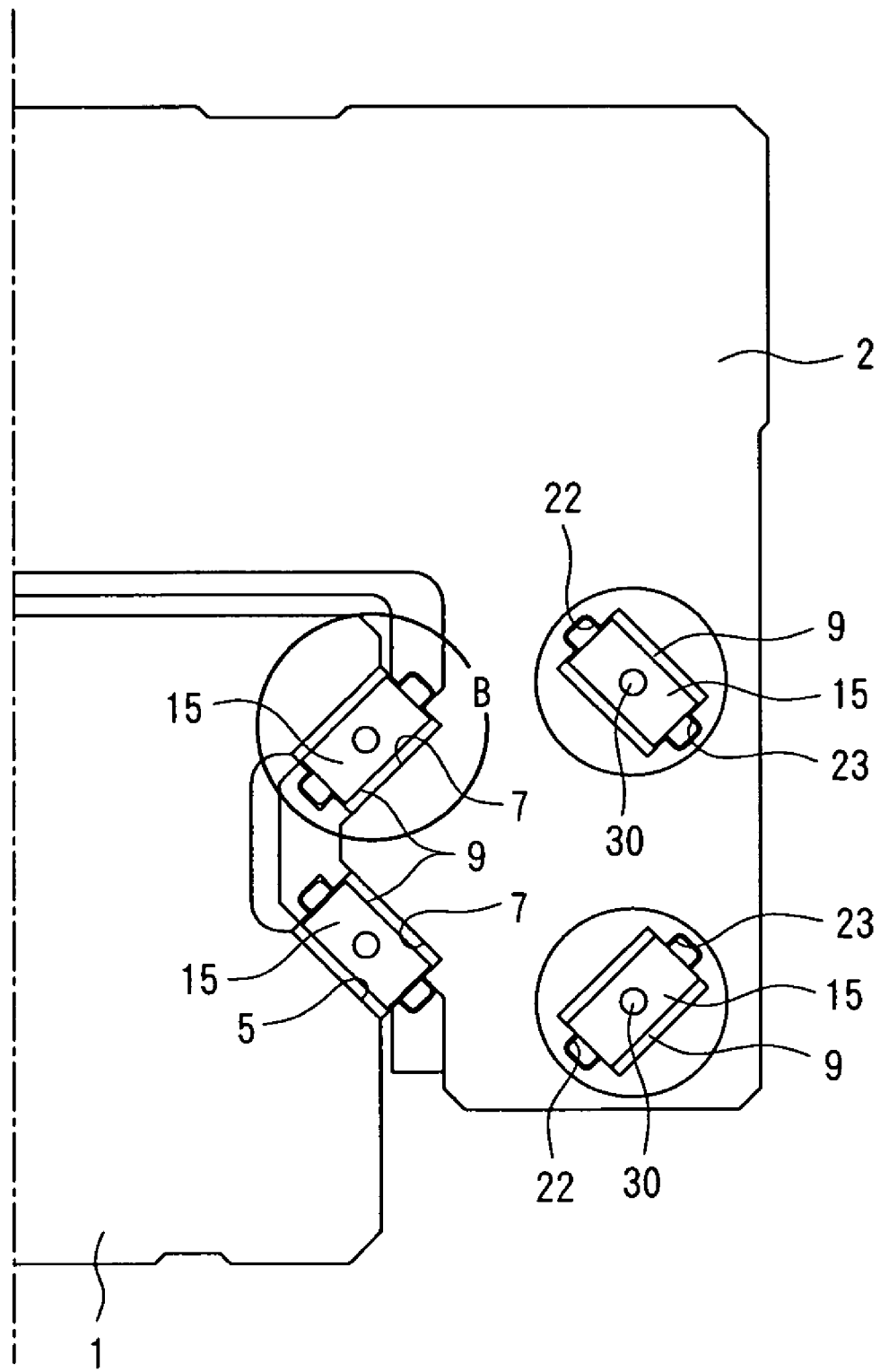
FIG. 33 is a one-half cross sectional view along the lateral direction of the linear guide device shown in FIG. 32.
Figure 34:
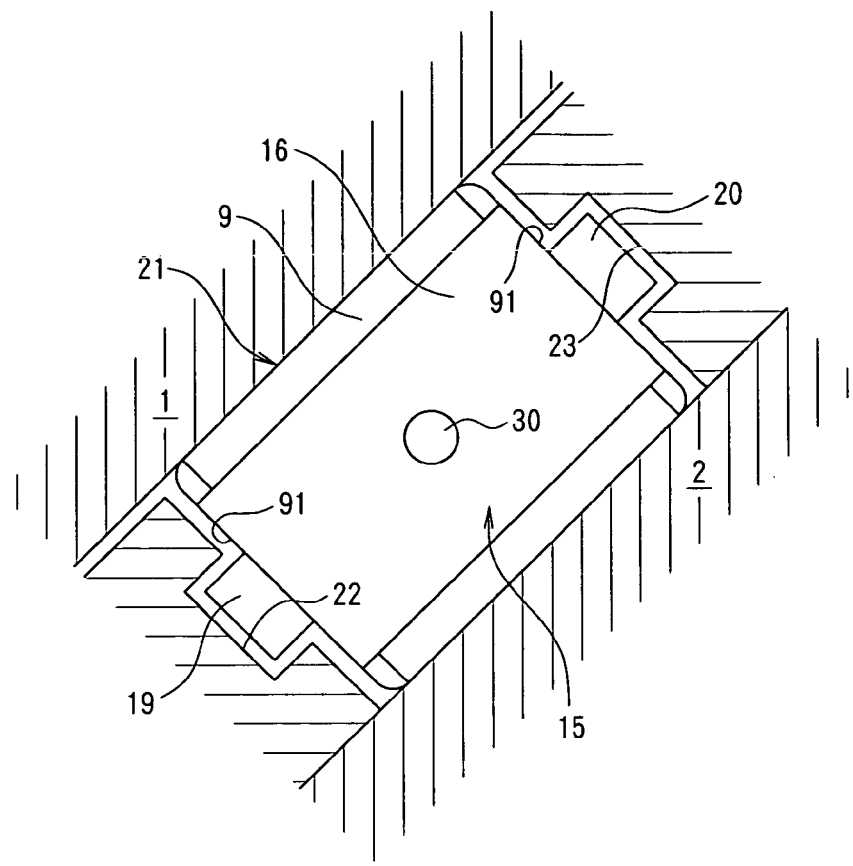
FIG. 34 is an enlarged view at a portion B in FIG. 33.

In FIG. 32, a linear guide device according to the fourth embodiment of the invention has a rail 1, a slider 2 having a front end face 2a and a rear end face 2b in the longitudinal direction of the rail 1 and two end caps 3 each attached on both end faces 2a and 2b in the front-to-rear direction of the slider 2.

The rail 1 is formed of a steel material such as an alloy steel. Rail attaching holes 4 for securing the rail 1 on a base of a machine tool by means of not illustrated bolts are perforated in an upper surface of the rail 1 each at a predetermined pitch in the longitudinal direction of the rail 1. Further, the rail 1 is formed into a shape similar to an I-shaped configuration for a cross section along the lateral direction of the rail 1. The rail-side raceway surfaces 5 are formed each by two on a lateral left face and a lateral right face of the rail 1 along the longitudinal direction of the rail 1.

The slider 2 is formed of a steel material such as an alloy steel like the rail 1. Threaded holes 6 for securing the slider 2 to a moving bed of a machining tool by means of not illustrated bolts are formed at plural positions in an upper surface of the slider 2. The slider 2 is formed into a shape similar with a saddle for the cross section along the lateral direction of the rail 1. Slider-side raceway surfaces 7 (refer to FIG. 33) are formed each by two to two opposed inner lateral faces of the slider 2 along the longitudinal direction of the rail 1.

The rail-side track way surface 5 and the slider-side track way surface 7 are opposed to each other in which a plurality of rollers 9 are assembled between the rail-side raceway surface 5 and the slider-side raceway surface 7. The rollers 9 are adapted to roll along rolling element rolling channels 10 (refer to FIG. 37) formed between the rail-side raceway surfaces 5 and the slider-side raceway surfaces 7, and then enter direction changing channels 11 for rolling elements formed in the end cap 3 when the slider 2 moves relatively in the longitudinal direction of the rail 1. The direction changing channels 11 for rolling elements are bent into a U-shaped configuration. The rollers 9 that have changed the direction along the direction changing channels 11 for rolling elements return to original position passing through rolling element returning channels 12 (refer to FIG. 37) formed in the slider 2, and then again roll along the path described above repetitively.

Retaining pieces 15 (refer to FIG. 37) formed of a resin material are interposed between each of the rollers 9. Each of the retaining pieces 15 comprise a retaining piece body 16 having two lateral face portions 161 and 162 in parallel with the end face portion 91 of the roller 9 (refer to FIG. 36). The retaining piece body 16 is formed with is formed with a first roller retaining face 17 for retaining a circumferential surface of one roller 9 of the two adjacent rollers 9 and formed with a second roller retaining face 18 for retaining the circumferential surface of the other roller 9 of the two adjacent rollers 9 as shown in FIG. 35.

Figure 36:
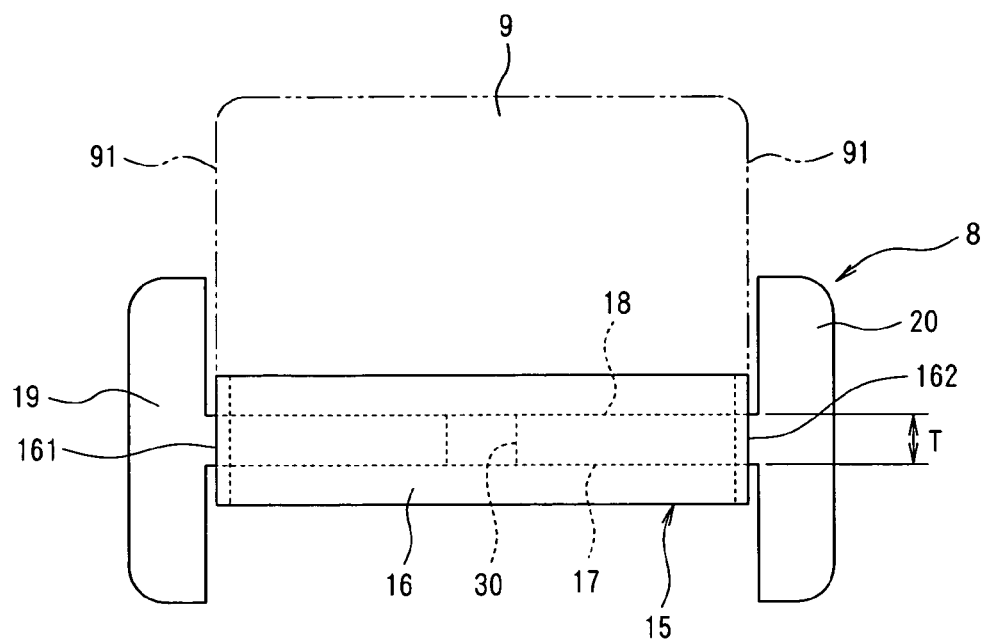
FIG. 36 is a plan view of a retaining piece shown in FIG. 35.
Figure 37:
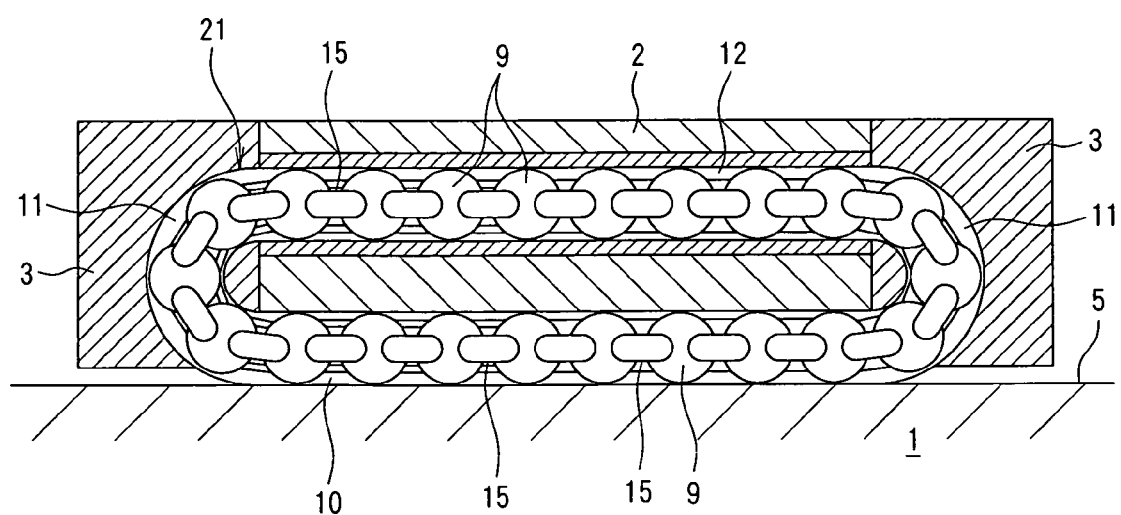
FIG. 37 is a view showing a circulation channel of the linear guide device shown in FIG. 32.

Further, the retaining piece 15 has a first arm portion 19 extending from the lateral left face 161 of the retaining piece body 16 toward the end face portion 91 of the two adjacent rollers 9 (refer to FIG. 36). A first guide groove 22 for guiding the retaining piece 15 by way of the first arm portion 19 is formed at a central portion of one wall surface of the two opposed wall surfaces of a circulation channel 21 having the rolling element rolling channel 10, the direction changing channel 11 for rolling elements and the rolling element returning channel 12 (refer to FIG. 34).

Further, the retaining piece 15 has a second arm portion 20 provided to the lateral right face 162 of the retaining piece body 16 in parallel with the first arm portion 19 (refer to FIG. 36). A second guide groove 23 for guiding the retaining piece 15 by way of the second arm portion 20 is formed at a central portion of the other wall surface 212 of the two wall surfaces 211 and 212 of the circulation channel 21 (refer to FIG. 34). Further, the retaining piece 15 has an oil reservoir hole 30 (refer to FIG. 34) and the oil reservoir hole 30 is formed at the central portion of the roller retaining faces 17, 18.

Figure 35:
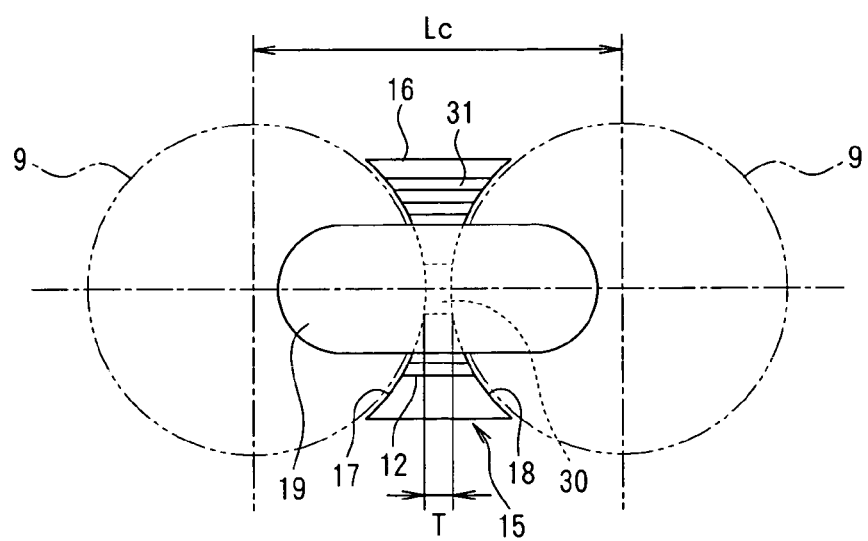
FIG. 35 is a side elevational view of a retaining piece shown in FIG. 34.

Assuming the minimum thickness of the retaining piece 15 at a portion put between the two adjacent rollers 9 as T, two kinds of retaining pieces including a thick retaining piece and a thin retaining piece with respect to the minimum thickness T are used in the fourth embodiment of the invention, and an identification mark 31 for identifying the kind is attached to each of the retaining pieces 15 (refer to FIG. 35).

In the constitution described above, for example, when rollers of 5 mm diameter (by the number of 50) are assembled in a circulation channel of 289.5 mm length and, further, retaining pieces of: T=0.8 mm (by the number of 30) and retaining pieces of: T=0.75 mm (by the number of 20) for the minimum thickness T is incorporated between each of the rollers, the distance between the centers of the two rollers adjacent with each other with the retaining piece at T=0.8 mm being interposed therebetween is: Lc=5.8 mm, while the distance between the centers of two rollers adjacent with each other with the retaining piece at T=0.75 mm interposed therebetween is: Lc=5.75 mm. In this case, the gap in the circulation direction resulting in the circulation channel is: 289−(30×5.8)−(20×5.75)=0.5 mm and an appropriate gap can be set in the circulation direction by the two kinds of retaining pieces 15.

In a case where the gap in the circulation direction changes after assembling due to the dimensional tolerance set to the direction changing channel 11 or the slider 2, etc. based on the design rule as described above, for example, when the circulation channel length after assembling increases to 289.7 mm, the combination of the two kinds of retaining pieces 15 is changed so as to increase the length formed by the rollers 9 and the retaining pieces 15 (referred to as length of roller row).

That is, in a case where the lateral gap is 0.7 mm after loading the retaining pieces with T=0.8 mm and the retaining pieces with T=0.75 mm together with rollers in the circulation channel, since this is longer by 0.2 mm relative to an appropriate gap in the circulation direction, an assembling operator identifies the retaining piece with T=0.75 mm by the identification mark 31 in order to increase the length of roller row. Then, the operator takes out the retaining pieces with T=0.75 mm by the number of four from the circulation channel and replaces them with the retaining pieces with T=0.8 mm, by which the gap in the circulation direction can be controlled from 0.7 mm to 0.5 mm. Further, since an inspection operator can visually recognize that the retaining pieces with T=0.8 mm are loaded more by the number of four compared with the standard number by way of the identification mark 31, it can be instantly recognized whether the appropriate assembling has been conducted or not with reference to the assembling operation table or the like. In a case where the circulation channel length is shortened to less than the designed value after assembling, by taking out the retaining pieces with T=0.8 mm by a required number from the circulation channel and replacing them with retaining pieces with T=0.75 mm, a linear guide device can be assembled as designed with respect to the length of the circulation channel.

Further, in the linear guide device, movement of the slider 2 is stabilized by applying a preload to the rollers 9 that roll along the rolling element rolling channel 10. For example, in a case where the distance between the rail-side raceway surface 5 of the rail 1 and the slide-side raceway surface 7 of the slider 2 is somewhat larger due to the dimensional tolerance and the use of a roller 9 of 5.005 mm diameter is necessary for obtaining an appropriate preload, the length of the roller row is longer by 0.25 mm than the designed standard value. In this case, by taking out the retaining pieces with T=0.8 mm by the number of five from the circulation channel and replacing them with the retaining pieces with T=0.75 mm, the length of the roller row can be controlled to a length as designed. In a case where the length of the roller row is shorter than the designed standard value, by taking out the retaining pieces with T=0.75 mm by the required number from the circulation channel and replacing them with the retaining pieces with T=0.8 mm, a linear guide device can be assembled with the length of the roller row being as designed.

In the fourth embodiment described above, while two kinds of retaining pieces, i.e., the thick retaining piece and the thin retaining piece with respect to the minimum thickness T were used, this is not restrictive but three or more kinds of retaining pieces of different minimum thickness T may also be used.

Further, while description has been made for the fourth embodiment that the retaining pieces 15 of different minimum thickness are identified by means of the identification mark 31, the identification mark 31 may be saved and the retaining pieces 15 may be classified, for example, by color on every kinds of different minimum thickness. For example, the retaining pieces may also be formed of resin pellets previously pigmented by kneading pigments of plural colors or a single color. Thus, the assembling operator or inspection operator can identify the retaining pieces of different minimum thickness at a glance.

The invention claimed is:

1. A linear guide device including a rail having a lateral left face and a lateral right face, a slider having a front end face and a rear end face in the longitudinal direction of the rail and having slider-side raceway surfaces opposing to rail-side raceway surfaces formed on the lateral left face and the lateral right face of the rail, end caps each attached to the front end face and the rear end face of the slider, a plurality of rollers that roll along with the relative linear motion of the slider though circulation channels formed of rolling element rolling channels formed between the rail-side raceway surfaces and the slider-side raceway surfaces, rolling element returning channels formed in the slider along the longitudinal direction of the rail and direction changing channels for rolling elements formed in the end caps, and a plurality of retaining pieces each disposed between the rollers, in which the retaining pieces have a retaining piece body having a lateral left face and a lateral right face, a first arm portion extending from the lateral left face of the retaining piece body toward end faces of the two adjacent rollers and fitting a first guide groove formed to one of wall surface portions of the circulation channels, and a second arm portion disposed in parallel with the first arm portion on the lateral right face of the retaining piece body and fitting a second guide groove formed to the other of the wall surface portion of the circulation channels, wherein the height of the retaining piece body and the height of the arm portions are defined to such a height that satisfies the conditional relations: $(H1-H2)/2 < (Dw-W)/2$, $H1 < Dw$, and $H2 < W$, where $H1$ represents the height of the retaining piece body in the direction crossing the axial direction of the roller, $H2$ represents the height of the first and the second arm portions in the direction crossing the axial direction of the roller, $W$ represents the width of the first and the second guide grooves in the direction crossing the axial direction of the roller, and $Dw$ represents the diameter of the roller, wherein the height of the first and the second arm portions in the direction crossing the axial direction of the roller is defined as a height that satisfies the conditional relation: $0.2 < H2/Dw < 0.5$ where $H2$ represents the height of the arm portions and $Dw$ represents the diameter of the roller.

2. A linear guide device according to claim 1, wherein the length of the first and the second arm portions is defined to such a length that both ends of the first and the second arm portions are situated to the outside of a circle having the center at a central portion of the retainer piece body and having a diameter $H3$, where $H3$ represents the distance between an outer lateral face of the first arm portion and an outer lateral face of the second arm portion.

3. A linear guide device according to claim 2, wherein the length of the first and the second arm portions is defined to such a length that both ends of the first and the second arm portions are situated to the outside of a circle having the center at a central portion of the rolling element rolling channel and having a diameter $H4$, where $H4$ represents the distance between a bottom of the first guide groove and a bottom of the second guide groove.

4. A linear guide device according to claim 2, wherein a distance $H5$ between an end portion of the outer lateral face of the first arm portion and an end portion of the outer lateral face of the second arm portion, and a distance $H6$ between a central portion of the outer lateral face of the first arm portion and a central portion of the outer lateral face of the second arm portion are in a relation: $H5 < H6$.

5. A linear guide device according to claim 4, wherein the end portion of the outer lateral face of the first and the second arms is formed as an arcuate face convex to the bottom of the first and the second guide grooves.

6. A linear guide device according to claim 4, wherein the end portion of the outer lateral face of the first and the second arm is formed as a tapered face relative to the bottom of the first and the second guide grooves.

7. A linear guide device according to claim 2, wherein a distance $H8$ between an end portion of an inner lateral face of the first arm portion and an end portion of an inner lateral face of the second arm portion, and a distance $H7$ between a central portion of the inner lateral face of the first arm portion and a central portion of the inner lateral face of the second arm portion are in a relation: $H7 < H8$.

8. A linear guide device according to claim 7, wherein the end portion of the inner lateral face of the first and the second arms is formed as an arcuate face convex to the end face of the roller.

9. A linear guide device according to claim 7, wherein the end portion of the inner lateral face of the first and the second arms is formed as a tapered face relative to the end face of the roller.

10. A linear guide device according to claim 1, wherein plural kinds of retaining pieces each of different minimum thickness are each interposed between each of the rollers, and each of the retaining pieces is applied with a identification mark for identifying the kind thereof.

11. A linear guide device according to claim 10, wherein the retaining pieces are classified by colors on every kinds of different minimum thickness.

\* \* \* \* \*